United States Patent
Takao et al.

(10) Patent No.: US 6,871,071 B2
(45) Date of Patent: Mar. 22, 2005

(54) HANDOVER CONTROL METHOD AND SYSTEM

(75) Inventors: Toshiaki Takao, Yokohama (JP); Hijin Sato, Yokohama (JP); Narumi Umeda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 569 days.

(21) Appl. No.: 09/926,088

(22) PCT Filed: Dec. 27, 2000

(86) PCT No.: PCT/JP00/09314

§ 371 (c)(1),
(2), (4) Date: Aug. 28, 2001

(87) PCT Pub. No.: WO01/49059

PCT Pub. Date: Jul. 5, 2001

(65) Prior Publication Data

US 2002/0160777 A1 Oct. 31, 2002

(30) Foreign Application Priority Data

Dec. 28, 1999 (JP) ............................................. 11-375800
Nov. 20, 2000 (JP) ....................................... 2000-353524

(51) Int. Cl.⁷ ................................................ H04Q 7/20
(52) U.S. Cl. ...................... 455/436; 455/445; 455/450; 455/453; 455/422.1; 370/331; 370/332
(58) Field of Search ............................... 455/436, 428, 455/432.1, 434, 437–439, 442, 450–454, 509, 513, 515, 445, 492.1; 370/329, 331, 335

(56) References Cited

U.S. PATENT DOCUMENTS

| | | | |
|---|---|---|---|
| 5,212,684 A | * | 5/1993 | MacNamee et al. ..... 455/426.1 |
| 5,454,026 A | | 9/1995 | Tanaka |
| 5,542,093 A | | 7/1996 | Bodin et al. |
| 5,974,319 A | * | 10/1999 | Kotzin et al. ................ 455/436 |
| 5,978,679 A | | 11/1999 | Agre |
| 6,212,384 B1 | * | 4/2001 | Almgren et al. ............. 455/446 |
| 6,374,112 B1 | * | 4/2002 | Widegren et al. ......... 455/452.2 |
| 6,445,924 B1 | * | 9/2002 | Rasanen ....................... 455/437 |
| 6,584,318 B2 | * | 6/2003 | Hakalin et al. .............. 455/453 |
| 2002/0019231 A1 | * | 2/2002 | Palenius et al. ............. 455/436 |

FOREIGN PATENT DOCUMENTS

| | | |
|---|---|---|
| JP | 5-41690 | 2/1993 |
| JP | 5-292012 | 11/1993 |
| JP | 9-135477 | 5/1997 |
| JP | 10-51836 | 2/1998 |
| JP | 11-69431 | 3/1999 |
| WO | WO 98/49858 | 11/1998 |
| WO | WO 99/51052 | 10/1999 |

* cited by examiner

Primary Examiner—David Hudspeth
Assistant Examiner—Kamran Afshar
(74) Attorney, Agent, or Firm—Oblon, Spivak, McClelland, Maier & Neustadt, P.C.

(57) ABSTRACT

In handover control methods and systems which switch a radio base station serving as a communicating counterpart of a mobile station, the present invention provides a handover control method and a system thereof wherein a detection is made when a communication while a predetermined minimum bandwidth secured is not possible at any mobile station communicating with the radio base station and upon the detection the communicating counterpart of the mobile station that communicates with the radio base station mentioned above is switched from the radio base station to other radio base stations.

42 Claims, 20 Drawing Sheets

FIG.15

|  | ONE RADIO BASE STATION | | TWO RADIO BASE STATIONS | | THREE RADIO BASE STATIONS | |
|---|---|---|---|---|---|---|
|  | OWN STATION | ADJACENT STATION | INCLUDING OWN STATION | ADJACENT STATION ONLY | INCLUDING OWN STATION | ADJACENT STATION ONLY |
| EVALUATION POINT | 5 POINTS | 4 POINTS | 3 POINTS | 2 POINTS | 1 POINT | 0 POINT |

FIG.16

|  | COMMUNICATION WITH ONE BS | | | | | COMMUNI -CATION WITH 2 BSs | COMMUNI -CATION WITH 3 BSs |
|---|---|---|---|---|---|---|---|
|  | COMMUNI -CATING COUNTER PART | ADJACENT STATIONS | | | | | |
|  | BS2 | BS1 | BS3 | BS4 | ... | | |
| MS1 | $y21+\varepsilon D$ | $y11+\varepsilon D$ | ... | ... |  | z | .... |
| MS2 | $y22+\varepsilon D$ | $y12+\varepsilon D$ | ... | ... |  | ... | .... |
| MS3 | $y23+\varepsilon D$ | $y13+\varepsilon D$ | ... | ... |  | ... | .... |
| MS4 | $y24+\varepsilon D$ | $y14+\varepsilon D$ | ... | ... |  | ... | .... |
|  |  |  |  |  |  |  |  |
| ⋮ |  |  |  |  |  |  |  |

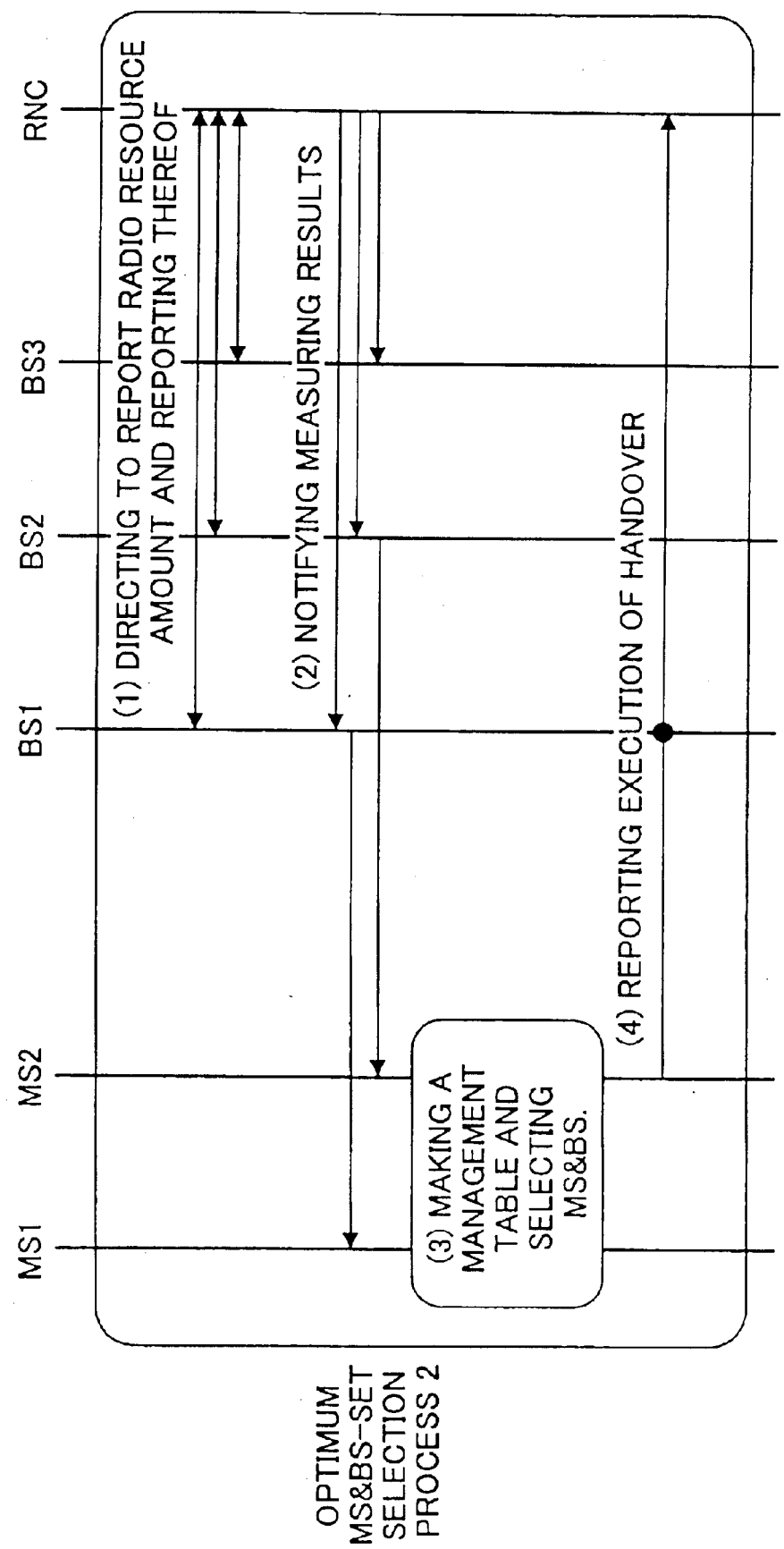

Ten years

HANDOVER CONTROL METHOD AND SYSTEM

TECHNICAL FIELD

The present invention relates to a control system that controls a mobile station in mobile communications, typically cellular phone communications, and specifically relates to the control of a mobile station when it switches base stations that the mobile station is communicating with, i.e., relates to the system which performs handover.

BACKGROUND TECHNOLOGY

In the mobile communications, such as cellular phone communications, the control of switching of radio base stations to communicate with in response to the movement of a mobile station, i.e., handover, is indispensable. FIG. 21 shows a conventional system that realizes handover. The system includes a mobile station 30, two or more radio base stations (here, a case with two radio base stations is shown) 21 and 22, and an RNC (Radio Network Controller: radio network control unit) 10. The RNC 10 includes an electric field intensity measurement control unit 11 and the radio resources management unit 12 and a switch 13.

Next, FIG. 22 shows the flow of the handover operation. The mobile station 30 is connected to a backbone network through the radio base station 1 (21) and the switch 13, and communicates through this backbone network with terminals that belong to the Internet, the PSTN (Public Switched Telephone Network) and the ISDN (Integrated Service Digital Network) which are operated by communication carriers other than the mobile communication carrier that manages the backbone network. When the mobile station 30 moves away from the radio base station 1 (21) and approaches the radio base station 2 (22), the electric field intensity from the radio base station 1 (21) becomes weaker, and, conversely, the electric field intensity from the radio base station 2 (22) becomes stronger. Since the electric field intensity measurement control unit 11 requires the mobile station 30 to measure and report the electric field intensities of nearby radio base stations including the radio base station 1 (21) (S1 of the operation flow), the mobile station 30 measures the electric field intensities of two or more radio base stations around itself, and transmits the information to the electric field intensity measurement control unit 11 through the radio base station 1 (21) on the communication line (S2 and S3 of the operation flow). The electric field intensity measurement control unit 11 informs the radio resources management unit 12 that handover will take place, when the electric field intensity of the radio base station 2 (22) becomes higher than the electric field intensity of the radio base station 1 (21) (S4 of the operation flow).

The radio resource management unit 12 controls radio resources required for communication between the mobile station and the radio base station. So to speak, radio resources are physical parameters, types of which are dependent on multiple accessing methods and duplexing methods that are used by a radio system. Specifically, in FDMA (Frequency Division Multiple Access), it is the bandwidth of a carrier wave, and the appropriated time length of the carrier wave to a certain communication, and, in TDMA (Time Division Multiple Access), it is the bandwidth of the carrier wave, and a number of time slots that are slices in a fixed interval of an appropriated time of the carrier wave. Further, in the case of CDMA (Code Division Multiple Access), it is the bandwidth, and transmission electric power density of the carrier wave, which is dependent on the spread factor. The maximum values of these values are determined by the maximum transmission capacity of each radio base station and a mobile station.

The radio resource management unit which manages radio resources such as above assigns the amount of radio resources equivalent to the radio resources which were being assigned to the radio base station 1 (21) to the radio base station 2 (22), in order to communicate with the mobile station 30, and sets up a new radio channel (S5 of the operation flow). That is, even if the communicating counterpart of the mobile station 30 is switched from the radio base station 1 (21) to the radio base station 2 (22), the transmission capacity of the mobile station 30 and the radio base station does not change. However, when an amount of the radio resources equivalent to prior to the switching was not available (S6 of the operation flow), or the electric field intensity of the radio channel newly set up was insufficient and not suitable for communication (S8 of the operation flow), re-selection of radio resources, or handover is suspended (S11 of the operation flow). Simultaneously, the radio resources management unit 12 controls the switch 13, and switches the connection between the backbone and the radio base station 1 (21) to the connection between the backbone and the radio base station 2 (22) (S9 of the operation flow). Further, the radio resources management unit 12 controls the mobile station 30 through the radio base station 1 (21) so as to switch the communicating counterpart from the radio base station 1 (21) to the radio base station 2 (22) (S10 of the operation flow). Since the switching control is performed synchronously, there is almost no communication interruption during the handover.

The control procedure mentioned above is called Mobile-Assisted Handover and used by PDC (Personal Digital Cellular Telecommunication System). Explanation of this procedure is detailed in "Personal Digital Cellular Telecommunication System ARIB Standard RCR STD-27H edition", published by Association of Radio Industries and Businesses.

As mentioned above, in the conventional handover system, the handover is triggered by monitoring and checking the electric field intensity or the amount of radio wave interference. For this reason, in conventional systems, the handover is not triggered when an amount of traffic which goes via a specific radio base station increases because of increase in the user's data volume of the mobile station 30. For this reason, a problem occurs that the radio resources of the radio base station run short, and the available communication bandwidth decreases. Although the communication itself can be secured in such a system that offers the packet telecommunication service which communicates user information in packets only when the user data to be transmitted is generated, for example, PDC-P (PDC mobile packet communications Systems) even if the radio resources run short, a sharp fall in a throughput is caused and there is a possibility of producing an inconvenience to the user. Further, it has been difficult to efficiently utilize radio resources of a mobile communications network as a whole by making a mobile station to communicate with another radio base station that has a margin in the radio resources, when the shortage of radio resources of a certain radio base station takes place.

Further, a minimum bandwidth guarantee type IP (Internet Protocol) communication service which guarantees only the minimum of a throughput is currently offered as a cheap communication service in a wired communications network. However, in the conventional mobile communications, since there was a possibility of causing the sharp fall in the throughput by the increase in traffic as mentioned above, it was difficult to apply such bandwidth guarantee service to mobile communications.

Further, conventionally, handover systems have been proposed (for example, JP, 2000-175243) to cope with a traffic congestion condition in the communication of a radio base station by switching a mobile station from the station with which the communication has been made to an adjacent radio base station. In such a handover system, directions of handover are made to all the mobile stations that communicate with the radio base station which is experiencing the traffic congestion condition. In addition, the handover takes place to each adjacent base station from all the mobile stations that are connected to the radio base station in the traffic congestion condition and that are capable of communicating with adjacent radio base stations.

If all the mobile stations are switched to the adjacent radio base stations from the radio base station that is in a traffic congestion condition in this way, the traffic amount in the congested radio base station will be lowered. However, depending upon traffic situation of the adjacent radio base stations to which the handover has been made, some of handed-over mobile stations may experience such a situation that it would have had a wider bandwidth available if it stayed with the original radio base station. In this case, the quality of the communication service which can be received by the mobile station will deteriorate.

DISCLOSURE OF INVENTION

The general purpose of the present invention is to offer a method and a system of a new and useful handover control, solving the problem of the conventional technology mentioned above.

The specific purpose of the present invention is to offer the method and the system of the handover control which enable the handover of the mobile station that communicates with the radio base station in a condition of traffic congestion to secure a level of communication service quality desired by a user as much as possible, when the radio base station experiences the traffic congestion.

The purpose of the present invention is served by the handover control method that detects an inability to communicate with a predetermined minimum bandwidth secured of any mobile stations in motion that are communicating with the radio base station, and switches the communicating counterpart of the mobile station that communicates with the radio base station mentioned above from the radio base station to another radio base station among handover control methods that switch a radio base station serving as the communicating counterpart of a mobile station.

In the handover control method, the communicating counterpart of the mobile station that communicates with the base station is switched to another radio base station when a communication securing the predetermined minimum bandwidth becomes impossible at any mobile stations in communication with the radio base station.

The mobile station whose radio base station serving as the communicating counterpart is to be switched may be the mobile station that has become incapable of communicating under a condition that secures the above-mentioned minimum bandwidth or any of other mobile stations. Further, the number of the mobile stations whose radio base station serving as the communicating counterpart is to be switched may be one or more.

Depending on the amount of radio resources currently used in the radio base station after the switching, when the communicating counterpart of the mobile station that experiences an impossibility of communication securing the minimum bandwidth mentioned above is switched to the other radio base stations, the communication securing the minimum bandwidth mentioned above may become possible. Further, when the communicating counterpart of mobile stations other than the mobile station communication that became impossible to communicate securing the above-mentioned minimum bandwidth are switched to other radio base stations, the radio resources used by the other mobile station can be assigned to communication of the mobile station communication that has become impossible to communicate, enabling a communication with the minimum bandwidth secured.

The purpose of the present invention is served by the handover control method that detects an inability to communicate securing the predetermined minimum bandwidth by the radio base station and any mobile stations in motion, and switches the communicating counterpart of the mobile station that communicates with the radio base station mentioned above from the radio base station to a plurality of other radio base stations among handover control methods that switch the radio base station serving as the communicating counterpart of a mobile station.

In the handover control method, the communicating counterpart of mobile stations is switched to the plurality of radio base stations. Consequently, radio resources required for communication in a mobile station is shared by the plurality of the radio base stations.

The plurality of the radio base stations switched as communicating counterparts of the mobile stations which communicate with the above-mentioned radio base station may also include the above-mentioned radio base station which was communicating with the mobile station concerned, before switching.

From a view point that it is desirable to switch the communicating counterpart of a mobile station to a radio base station whose electric field intensity becomes higher, a structure can be such that a radio base station that provides the highest electric field intensity and the mobile station that receives the signal, excepting the combination of the mobile station and the radio base station that are currently communicating, are selected as the mobile station and the radio base station for the communicating counterpart as the object of the handover, based on the information relative to the electric field intensity of the radio base station acquired from each mobile station in each handover control method mentioned above.

From a view point that it is desirable that the mobile station whose communication bandwidth is below a standard is switched as much as possible to the radio base station which has a sufficient radio resource available, a structure can be such that a mobile station that has the radio resources allocation the closest to the minimum bandwidth, having no allowance to increase in the user data volume, and a radio base station that has the largest amount of the radio resources available are selected as the mobile station and the radio base station for the handover.

From a similar perspective, a structure can be such that a mobile station whose minimum bandwidth is the largest and that requires the radio resources, and a radio base station that has the largest amount of the radio resources available are selected as the mobile station and the radio base station for the handover.

From a viewpoint of offering a specific technique for detecting an inability to communicate with the minimum bandwidth secured, the detection of the inability to communicate with the minimum bandwidth secured between mobile stations and the base station can be performed based on measuring results by measuring one or a combination of the electric field intensity, a bit error rate, a frame error rate, and a packet discard rate.

Further, the mobile station mentioned above can choose the radio base station which serves as a communicating counterpart after switching mentioned above. The radio base station which serves as the communicating counterpart after the above-mentioned switching may also be selected in a node other than the above-mentioned mobile station, the information relative to the selected radio base station is notified to the mobile station concerned from the node concerned, and the radio base station which serves as a communicating counterpart of the mobile station concerned can be switched to the notified radio base station.

From a viewpoint of enabling handover between radio communication systems which adopt different protocols, a structure can be as follows. In the handover control method mentioned above, when it is detected that a communication with the radio base station becomes impossible with the minimum bandwidth secured at any of mobile stations in the first radio communications system that adopts the first communication protocol, and upon switching the communicating counterpart of the mobile station that communicates with the radio base station mentioned above to a radio base station in the second radio communication system that adopts the second communication protocol, the information relative to the radio resources of the mobile station concerned is transferred from the first radio communication system mentioned above to the second radio communication system mentioned above via a wired section after converting the protocol.

Further, the purpose mentioned above relative to the handover control method for switching a radio base station that is the communicating counterpart of a mobile station, is served as follows. A check is made as to whether or not the communication of the radio base station will become congested, and if a decision is made that the communication of the radio base station will be congested, a choice will be made from combinations of any mobile stations that communicate with the radio base station concerned and one or more radio base stations that can communicate with the mobile stations concerned according to a predetermined standard, and the communicating counterparts of the mobile stations in the selected combination are switched to one or more radio base stations.

In such a handover control method, if a decision is made that the communication of a radio base station is in a traffic congestion condition, a combination of any mobile stations that communicate with the base station concerned and one or more radio base stations that can communicate with the mobile stations is selected in accordance with a predetermined standard. In addition, the communicating counterpart of the mobile stations in the selected combination is switched to one or more radio base stations in the combination.

The number of combinations of the mobile station and one or more radio base stations to be selected can be singular or plural. Further the mobile station concerned and the above-mentioned radio base station which performs the on-going communication can also be included in the plurality of the radio base stations.

The traffic congestion condition in the above-mentioned radio base station can be determined based on various information such as an available amount of the radio resources of the radio base station concerned, radio resources amount that the mobile station that will communicate with the radio base station concerned will use, an error rate in the communication, and whether or not the communication is being performed with the predetermined minimum bandwidth.

From a viewpoint that the communicating counterpart of a mobile station can be switched to the radio base station that has a margin in the radio resources as much as possible, a structure can be such that the predetermined standard for selecting the combination of the above-mentioned mobile station and a radio base station is defined by the available amount of the radio resources of the radio base station or the required amount of the radio resources.

From a viewpoint that the communicating counterpart of a mobile station can be switched to a radio base station with a better communication condition as much as possible, the predetermined standard for selecting the combination of the above-mentioned mobile station and a radio base station can be defined based on the receiving electric field intensity in communication between a mobile station and a radio base station.

From a viewpoint that the communicating counterpart of the mobile station whose required data communication volume is not satisfied can be switched as often as possible, the predetermined standard for selecting the combination of the above-mentioned mobile station and a radio base station can be defined based on a ratio of the amount of radio resources permitted to the mobile station to the amount of radio resources currently used in fact.

From a viewpoint that the switching of the communicating counterpart of a mobile station is easy, the predetermined standard for selecting the combination of the above-mentioned mobile station and a radio base station can be defined based on the number of the radio base stations with which a mobile station should perform simultaneous communications after switching the communicating counterpart.

In such a handover control method, the communicating counterpart of a mobile station can be switched with a priority to a fewer number of radio base stations, for example. In this case, the switching to a fewer number of radio base stations can be performed comparatively easily.

From a viewpoint that the radio base station handling the on-going communication can be included in the radio base station to which the switching is to be performed as much as possible as a communicating counterpart for the mobile station after the switching, the predetermined standard for selecting the combination of the above-mentioned mobile station and a radio base station can be defined based on whether or not to include the radio base station handling the on-going communication as the radio base station to communicate after the switching of the communicating counterpart of the mobile station.

In the above-mentioned handover control method, a structure can be such that a priority is attached to the combinations of each mobile station that communicates with the radio base station concerned and one or more of the radio base station concerned and its adjacent radio base stations, thereby selecting a combination of a mobile station and a radio base station that has a higher priority.

The above-mentioned priority is the ranking about the appropriateness of a mobile station and a radio base station communicating mutually, and it can be, but is not limited to be, expressed by a mark given in accordance with the predetermined standard or it may be expressed by the ranking itself. That is, the combination of the mobile station and radio base station where a priority is the higher means that it is the more suitable for communicating. "Suitable for communicating" means that a better quality communication can be carried out under a satisfactory condition, and that the control required for handover can be performed easily.

From a viewpoint that a handover process can be performed centrally, a structure can be such that, relative to the handover control method mentioned above, the process for selecting a combination of any mobile station that communicates with the radio base station concerned and one or more radio base stations with which the mobile station concerned can communicate is performed in a node connected with each radio base station via a wired section.

From a viewpoint that a process about handover can be performed in a distributed fashion, a structure can be such that, relative to the handover control method mentioned above, the mobile station communicating with the radio base station concerned performs the process in which it chooses a combination of the mobile station concerned and one or more radio base stations with which a communication is possible in accordance with the above-mentioned predetermined standard.

Further, in the above-mentioned handover control method, a structure can be such that the above-mentioned mobile station which communicates with the radio base station concerned determines whether the radio base station concerned is in a traffic congestion condition.

From a viewpoint that the communication of a mobile station is maintained reliably in high quality, the handover control method mentioned above can be structured such that when the communication condition between the mobile station and one or more radio base stations is supervised and the supervised communication condition is in a condition worse than a predetermined standard condition, after switching the communicating counterpart of the above-mentioned mobile station to the one or more radio base stations mentioned above, switching of the communicating counterpart of the mobile station concerned may be performed once again.

In such a handover control method, when the communication condition between the mobile station and the radio base station after the switching is worse than a predetermined condition after switching the communicating counterpart of a mobile station, the communicating counterpart of the mobile station is switched again. In this manner, the mobile station concerned can ensure communication in the better condition.

In the above-mentioned handover control method, a structure can be such that an error rate of the communication between a mobile station and one or more radio base stations is supervised as the communication condition mentioned above.

Further, the above-mentioned purpose in the handover control system that switches a radio base station serving as the communicating counterpart of a mobile station is served by a detection means for detecting that the communication with the predetermined minimum bandwidth secured becomes impossible at any of mobile stations communicating with the radio base station, and a switching means for switching the communicating counterpart of the mobile station communicating with the above-mentioned radio base station from the radio base station concerned to another radio base station when the detection means detects that any mobile station becomes incapable of communicating with the predetermined minimum bandwidth secured.

Further, the purpose of the present invention described above in the handover control system that switches a radio base station serving as the communicating counterpart of a mobile station is served by a detection means for detecting that the communication with the predetermined minimum bandwidth secured becomes impossible at any of mobile stations communicating with the radio base station, and a switching means for switching the communicating counterpart of the mobile station communicating with the above-mentioned radio base station from the radio base station concerned to a plurality of other radio base stations when the detection means detects that any mobile station becomes incapable of communicating with the predetermined minimum bandwidth secured.

Further, the purpose of the present invention described above in the handover control system that switches a radio base station serving as the communicating counterpart of a mobile station is served by a handover system that includes a traffic congestion checking means for checking whether or not the communication traffic in the radio base station becomes congested, a selection means for selecting a combination of a mobile station communicating with the radio base station concerned and one or more radio base stations that are capable of communicating with the mobile station concerned according to a predetermined standard when the traffic congestion checking means determines that the communication traffic of the radio base station is congested, and a switching control means for switching the communicating counterpart of the mobile station in the combination selected to one or more radio base stations in the combinations that are selected.

In addition, other purposes, features, and advantages of the present invention are clarified by detailed explanation in the following with reference to appended drawings.

BRIEF EXPLANATION OF THE DRAWINGS

FIG. 15 shows an example (No. 3) of an evaluation point table.

FIG. 16 shows an example of a management table for an evaluation point.

FIG. 17 is a sequence drawing showing an example of the process procedure for selecting the optimum mobile station and a radio base station in the sixth example of the handover system of the present invention.

THE BEST MODE IMPLEMENTATION OF THE INVENTION

Hereafter, embodiments of the present invention will be described based on the drawings.

Figure 1:
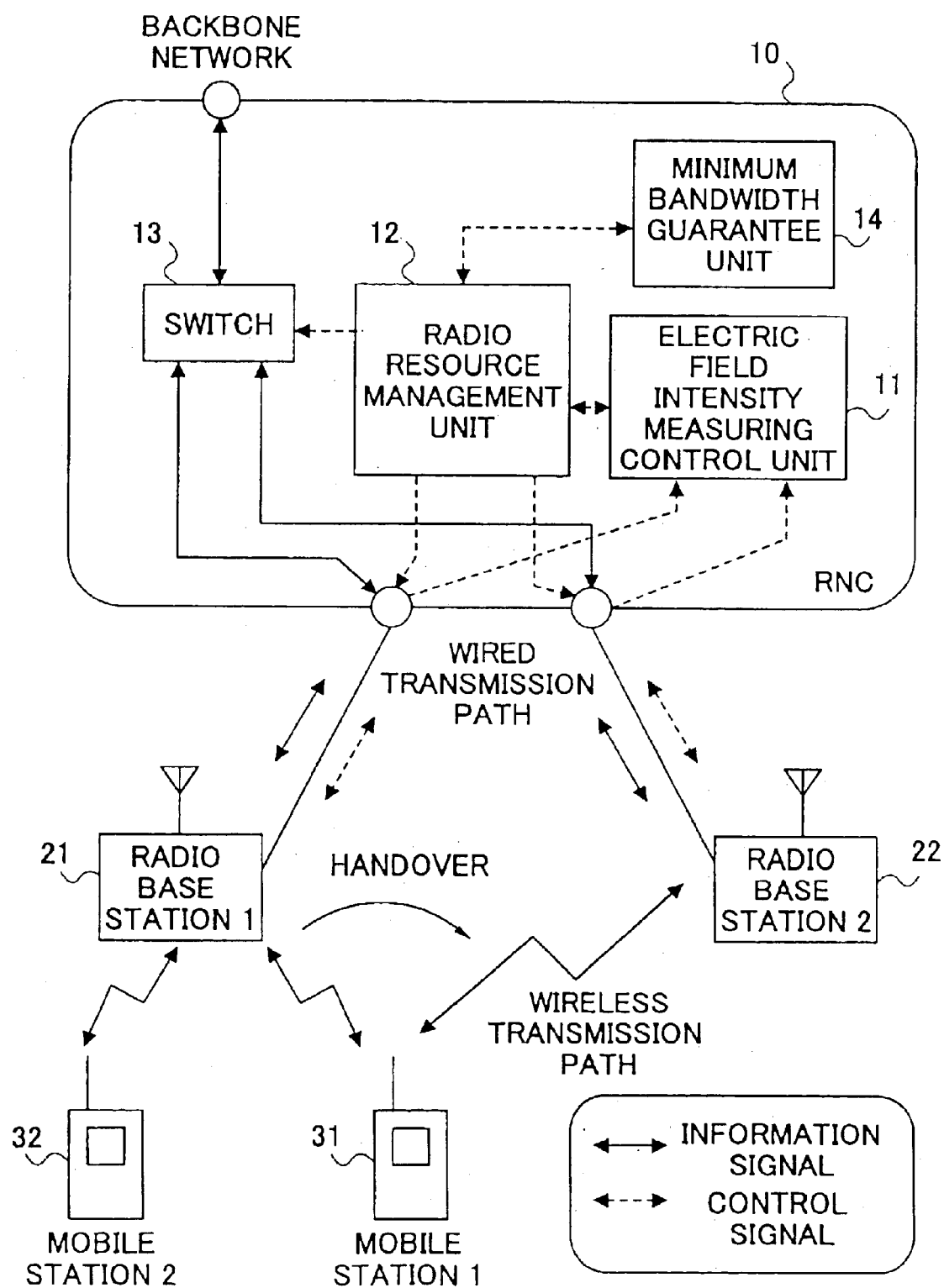
FIG. 1 is a block diagram showing the first example of the handover system of the present invention.

FIG. 1 is the block diagram showing the first example of the handover system concerning the implementation mode of the present invention.

This system includes mobile stations (here 1 and 2) 31 and 32, two or more radio base stations (here 1 and 2) 21 and 22, and an RNC 10. The RNC 10 includes a minimum bandwidth guarantee unit 14, an electric field intensity measurement control unit 11, radio resources management unit 12, and a switch 13.

Figure 2:
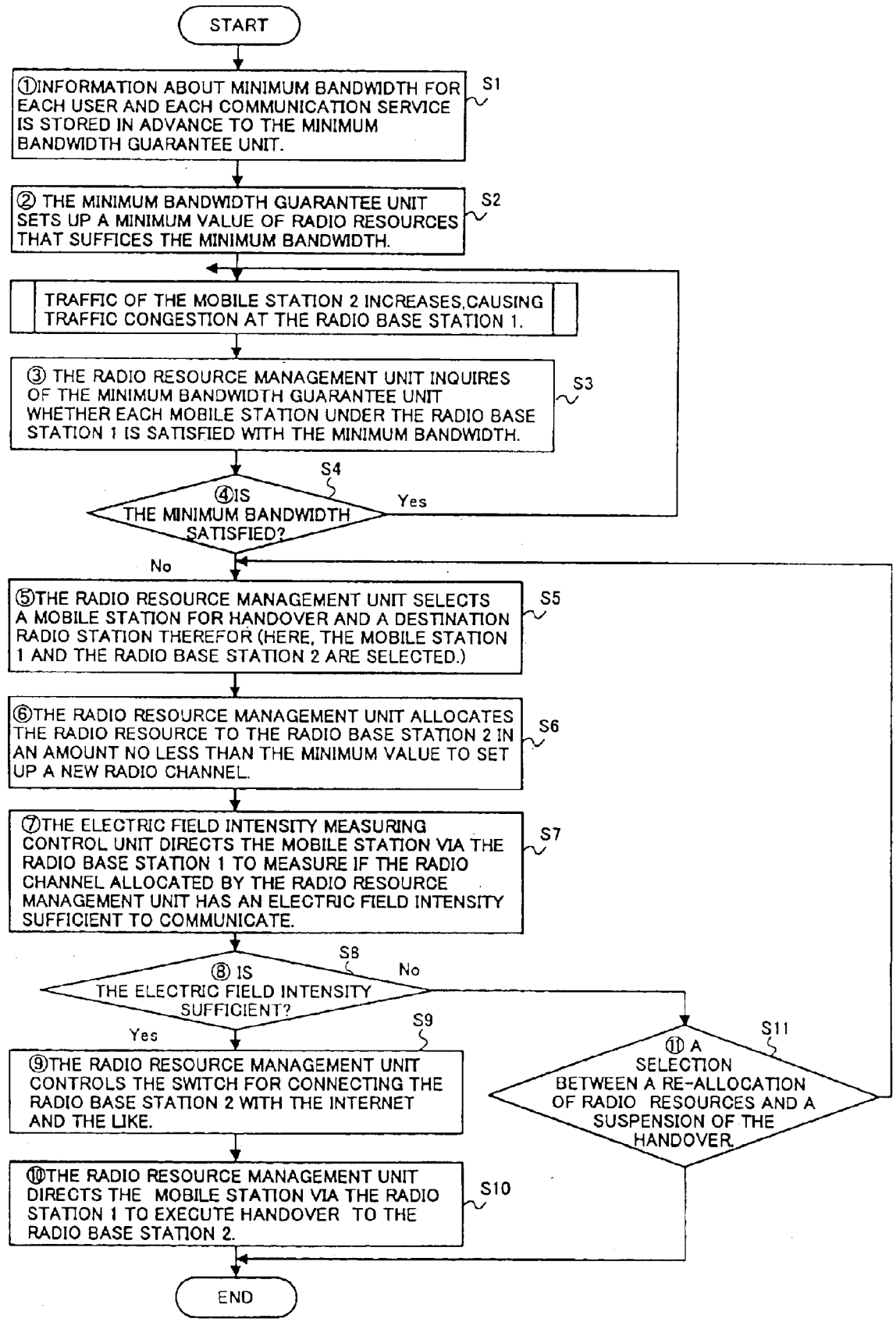
FIG. 2 shows the operation flow of the handover system of the present invention.

FIG. 2 shows the operation flow of this system. First, the mobile station 1 (31) and the mobile station 2 (32) shall communicate with different terminals in the Internet, PSTN and ISDN through the radio base station 1 (21), the switch 13, and a backbone. A description will be made as to the case where data volume of the user of the mobile station 1 (31) increases, and the radio base station 1 (22) is becoming in a traffic congestion condition at this time. First, the minimum bandwidth guarantee unit 14 stores the minimum bandwidth required for each user and for each communication service beforehand (operation flow S1). Next, the minimum bandwidth guarantee unit 14 sets up the minimum value of the amount of radio resources which satisfies the minimum bandwidth of the user request based on this information (S2 of the operation flow). For example, the minimum required numbers of radio carriers, slots, or spreading codes, either independently or any combination thereof are set up. In addition, it is also possible to restrict the number of the mobile stations that make a random access to a specific radio channel.

The radio base station 1 (21) measures the amount of traffic which passes through itself, and if it is congested, it will notify the fact to the radio resources management unit 12. The radio resource management unit 12 needs to allocate additional radio resource corresponding to the increase in traffic in the radio base station. However, the radio resources of one radio base station are limited, and runs short of the radio resources. Then, the radio resources management unit 12 inquires the minimum bandwidth guarantee unit 14 whether communication of the radio base station 1 (21) with each mobile station is satisfying the minimum bandwidth (S3 of the operation flow). Upon the inquiry (S4 of the operation flow), if there is a mobile station for which the minimum bandwidth is not satisfied, the radio resources management unit 12 will select a mobile station (the mobile station 1 (31) in this description) and a radio base station (the radio base station 2 (22) in this description) for carrying out the handover. As selection methods, (1) a method to choose a radio station that gives the highest electric field intensity, and the mobile station which received this, based on the electric field intensity information on the radio base station obtained from each mobile station through the electric field intensity measurement control unit 11, (2) a method to choose a mobile station with an allocation of radio resources the closest to the minimum bandwidth, and a radio base station in which the radio resources is left the most based on the radio resources management information, (3) a method to choose a mobile station whose value of the minimum bandwidth is large and needs a large amount of the radio resources, and a radio base station that has the largest amount of the radio resources available, and the like are possible. Further, a set of the plurality of the methods may be used. Further, radio resources is assigned to the radio base station 2 (22) so that the radio resources of which amount may not be less than the minimum value of the amount of radio resources defined by the minimum bandwidth guarantee unit 14 to this radio base station, setting up a new radio channel (S6 of the operation flow). Next, the electric field intensity measurement control unit 11 directs the mobile station 1 (31) to supervise whether the newly set-up radio channel is suitable for communication via the radio base station 1 (21) (S7 of the operation flow). If suitable for communication, the electric field intensity measurement control unit 11 directs execution of the handover to the radio resources management unit 12. The radio resource management unit 12 controls the switch 13, and switches the connection between the backbone and the radio base station 1 (21) to the connection between the backbone and the radio base station 2 (22) (S9 of the operation flow). Further, the radio resources management unit 12 controls the radio base station 1 (21), the radio base station 2 (22), and the mobile station 1 (31) to switch the communicating party of the communication of the mobile station from the radio base station 1 (21) to the radio base station 2 (22) completely (S10 of a work flow). These switching actions are performed synchronously.

In addition, this handover system is also equipped with functions to supervise a fall in the electric field intensity, an occurrence of radio wave interference and an occurrence of fading in performing the handover as in conventional systems.

Figure 3:
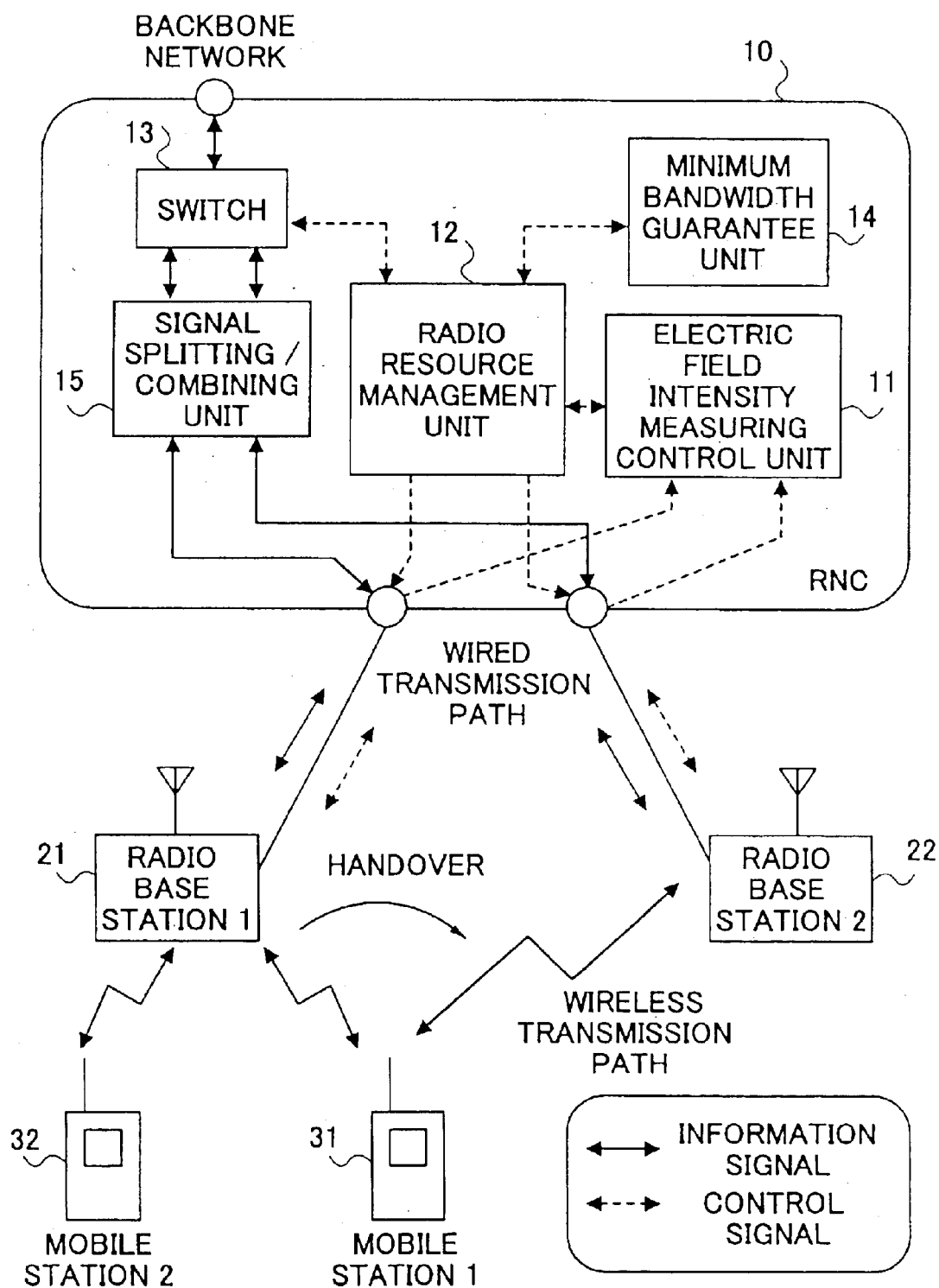
FIG. 3 is a block diagram showing the second example of the handover system of the present invention.
Figure 4:
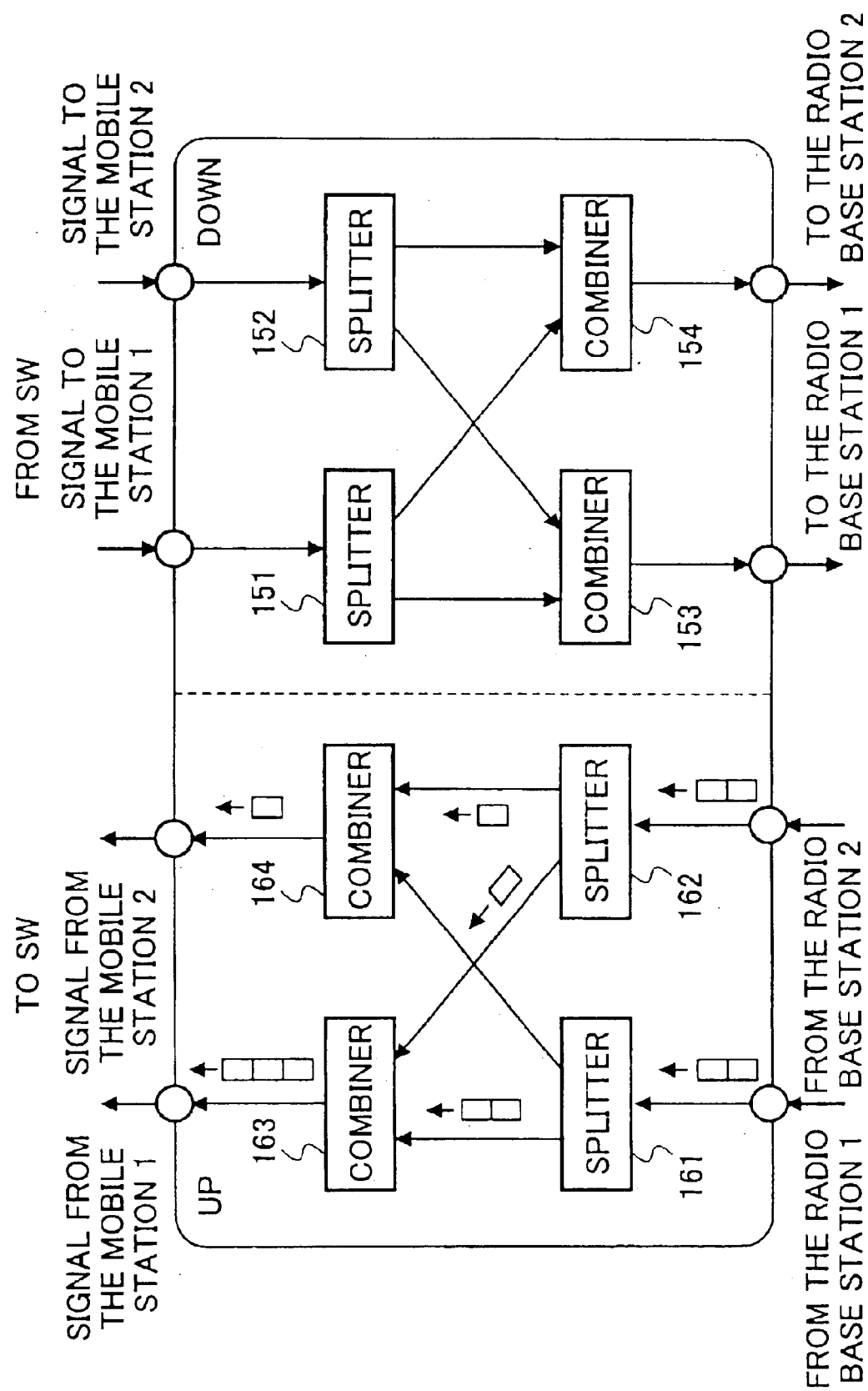
FIG. 4 shows an example of structure of a signal splitting/combining unit of the present invention.

FIG. 3 shows the second example of the handover system concerning the implementation mode of the present invention. In this system, when neither the radio base station 1 (21) nor the radio base station 2 (22) can singly provide a sufficient radio resource, the minimum bandwidth is secured by communicating with both the radio base station 1 (21) and the radio base station 2 (22) by adding up the data transmission capacity of both communications. When it still runs short, the third and fourth radio base stations will be selected, and the minimum bandwidth is guaranteed by communicating with a number of radio base stations. The system of the present invention includes the mobile stations (here 1 and 2) 31 and 32, two or more radio base stations (here 1 and 2) 21 and 22, and the RNC 10. The RNC 10 includes the minimum bandwidth guarantee unit 14, the signal splitting/combining unit 15, the electric field intensity measurement control unit 11, the radio resources management unit 12, and the switch 13. The example of the signal splitting/combining unit 15 is shown in FIG. 4. In the unit, circuits are divided into the upstream circuit and the downstream circuit. Signals are input to the upstream circuit from the base station and to the downstream circuit from an exchange. These signals are divided into signals for every radio base station in the case of the downstream signal and for every mobile station in the case of the upstream signal by the distribution units 151, 152, 161, and 162. The distributed signal is compounded and outputted by the combining units 153, 154, 163, and 164 according to the sequence of transmission at the transmitting source.

On the other hand, the mobile station compliant with this system is equipped with two or more transceiver units for communicating with two or more radio base stations, and signal splitting/combining units for distributing user information to two or more transceiver units. In addition, the structure of the signal splitting/combining unit may be obtained by eliminating the combiner in the upstream circuit and the splitter in the downstream circuit, and further using one input terminal on the upstream side and one output terminal on the downstream side in reference with FIG. 4 presented above.

Figure 5:
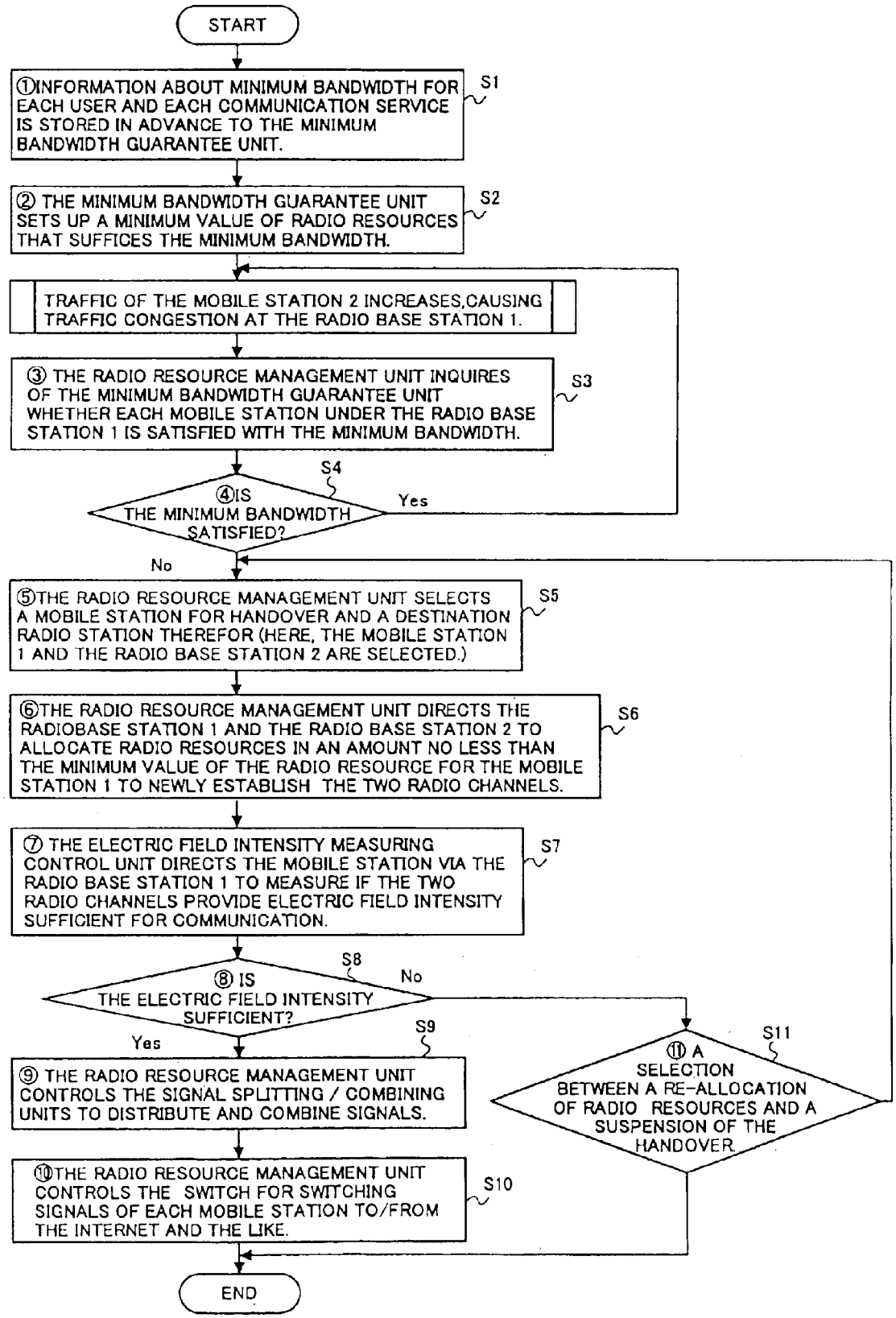
FIG. 5 shows the operation flow of the second example of the present invention.

FIG. 5 shows the operation flow. When it is determined that the minimum bandwidth desired by a user is not satisfied (S4 of flow of operation), the radio resources management unit 12 chooses a plurality of mobile stations and radio base stations for which handover is to take place (S5 of the operation flow). As specific selection methods, the method of giving priority to combinations where a high electric field intensity of the radio base station is measured by the mobile stations, the method of giving priority to combinations that leave more room of the radio resources, and the method that combines these methods are possible. Next, the radio resources management unit 12 assigns radio resources so that the minimum bandwidth which the mobile station 1 (31) needs may be satisfied, and a new radio channel may be set up relative to the selected mobile station 1 (31) and selected two or more radio base station (S6 of the operation flow). Next, the electric field intensity measurement control unit 11 directs the mobile station 1 (31) to measure the electric field intensity and report the result in order to determine whether the radio channel which the radio resources management unit 12 newly set up is suitable for communication. If the electric field intensity measurement unit 12 determines that the newly set up channel is suitable for communication, it directs the radio resources management unit 12 to carry out handover. The radio resource management unit 12 controls the splitting/combining unit 15, splitting and combining signals for each mobile station (S9 of the operation flow). Further, the radio resources management unit 12 controls the switch 13, switching the signal for every mobile station, and sends out this signal to the Internet or the like through the backbone (S10 of the operation flow).

Figure 6:
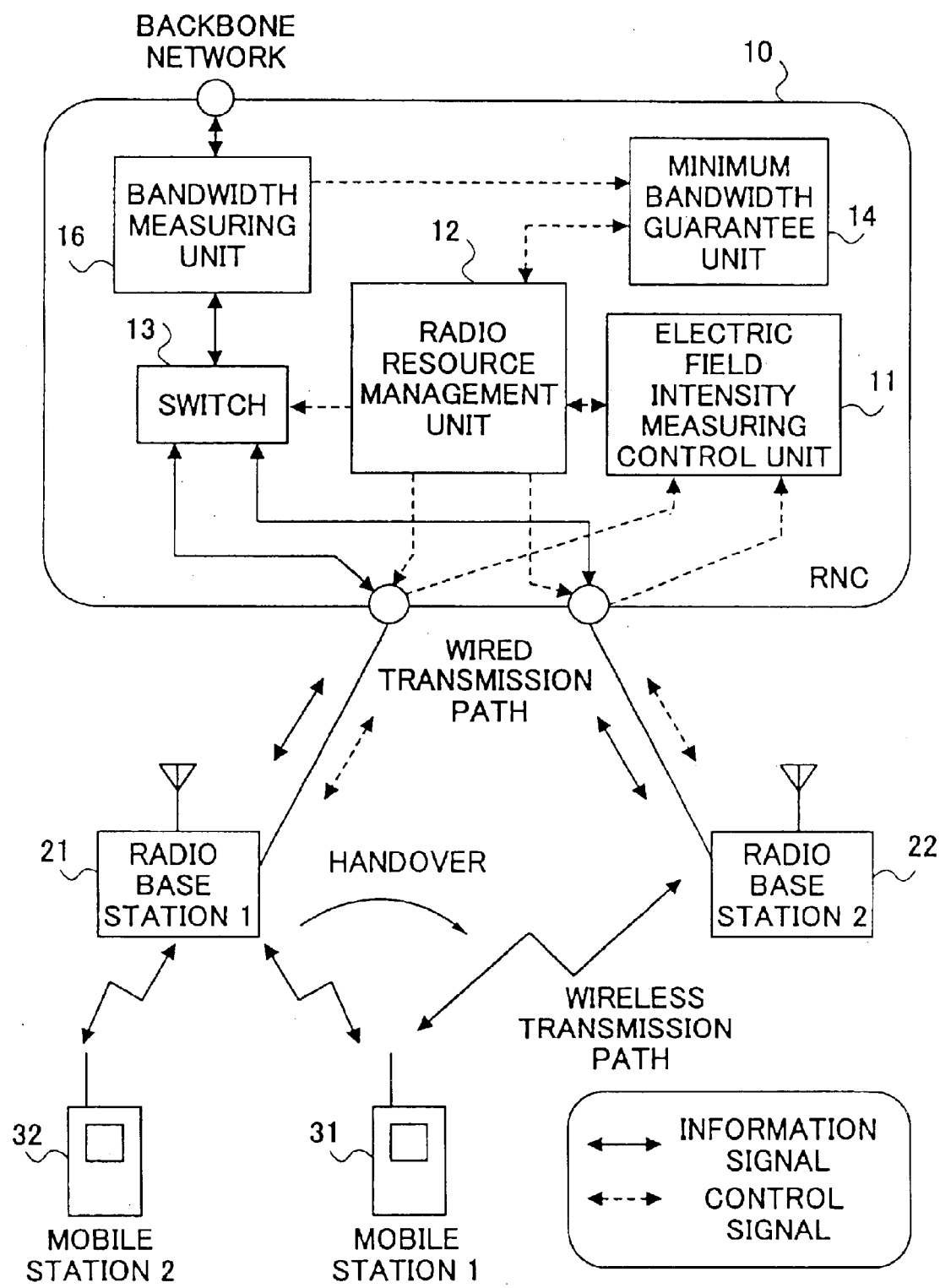
FIG. 6 is a block diagram showing the third example of the handover system of the present invention.
Figure 7:
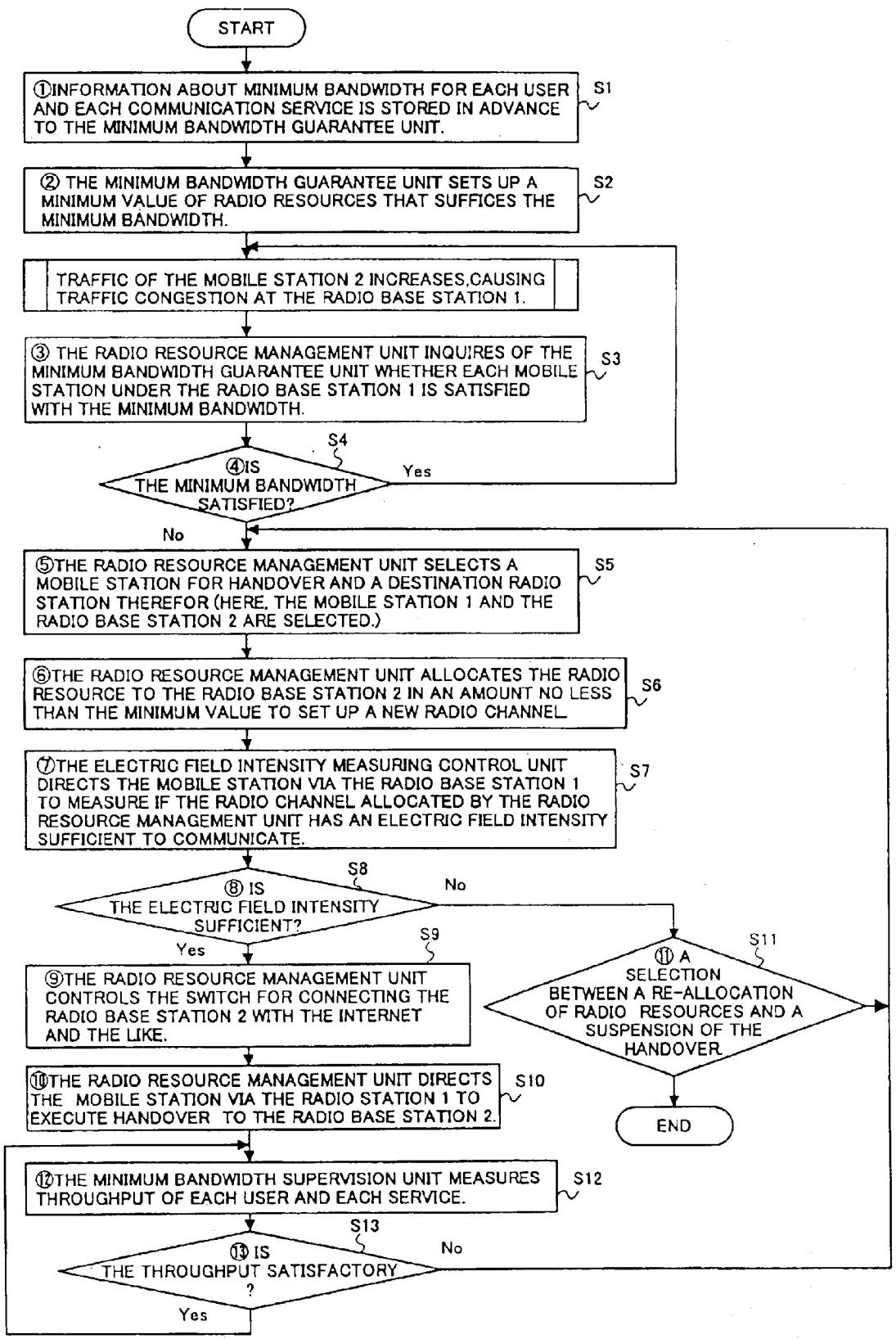
FIG. 7 shows the operation flow of the third example of the present invention.

FIG. 6 shows the third example which added the bandwidth measuring unit 16 that supervises whether the minimum bandwidth of each user and each communication service is secured to the handover system mentioned above. FIG. 7 shows the operation flow. In the system of the present invention, the bandwidth measuring unit 16 may be installed, for example, between the switch 13 and the backbone to measure throughput of each user and all or any of the communication services (S12 of the operation flow). Specifically, as for the information signal which has a frame structure, each frame has an error detection function. For this function, CRC (Cyclic Redundancy Control) which adds a redundant code may be used, for example. The throughput in unit time is obtained using this facility by disregarding frames if a frame error is detected where, for example, there is no retransmission performed. Further, when the measurement result shows non-fulfillment of the minimum bandwidth (S13 of the operation flow), the minimum bandwidth guarantee unit 14 re-assigns radio resources and a new radio channel is set up.

Figure 8:
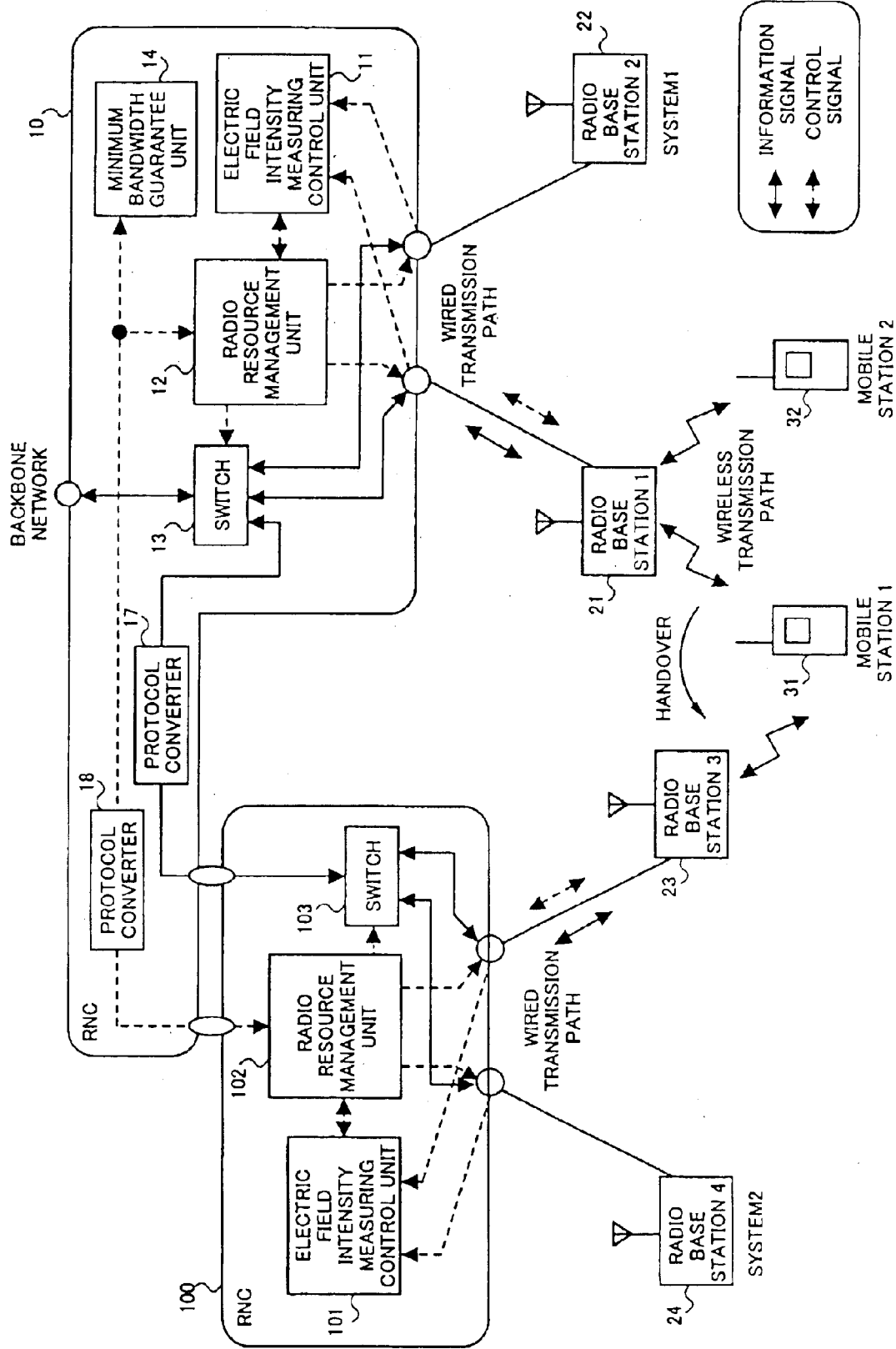
FIG. 8 is a block diagram showing the fourth example of the handover system of the present invention.

FIG. 8 shows the fourth example where a handover system is applied to a handover between systems that use different communication protocols for the radio transmission path. Structure of this system includes a system 2 that has a similar structure to conventional examples and performs equivalent operations, and a system 1 that has the system 2 under itself and that has the radio transmission path of a different communication protocol from the system 2. As an example of this case, the system 1 may correspond to IMT-2000 and the system 2 may correspond to PDC.

The system 1 includes the mobile stations (here 1 and 2) 31 and 32, two or more radio base stations (here 1 and 2) 21 and 22, and the RNC 10. The RNC 10 includes the minimum bandwidth guarantee unit 14, protocol converters 17 and 18, the electric field intensity measurement control unit 11, the radio resources management unit 12, and the switch 13.

In this system, the switch 13 of the system 1 and a switch 103 of the system 2 are connected through the protocol converter 17. Further, the minimum bandwidth guarantee unit 14 of the system 1 and the radio resources management unit 102 of the system 2 are also connected through the protocol converter 18. Here, the communication protocols of the radio transmission path in this system differ in the system 1 and the system 2. Therefore, in order that a mobile station complies with the communication protocol of both systems, it is equipped with a transceiver unit for the system 1, and a transceiver unit for the system 2. Further, it also has a switch that switches the two transceiver units by control from the system 1 or the system 2.

Although operation of this system is almost equal to the contents of the operation described in the first example mentioned above, it differs in that the minimum bandwidth guarantee unit 14 communicates with the radio resources management unit 102 of a system 2 via the protocol converter 18. Further, the radio resources management unit 12 of the system 1 and the radio resources management unit 102 of the system 2 exchange information with each other via the protocol converter 18 when adjusting between the two for assignment of radio resources.

Further, the fifth example of the handover system concerning the implementation mode of the present invention will be described. In this fifth example, when a radio base station experiences a traffic congestion condition, mobile stations suitable for handover to adjacent base stations will be selected from mobile stations which are communicating with the radio station, and the selected mobile stations are handed-over to the adjacent radio base stations.

Figure 9:
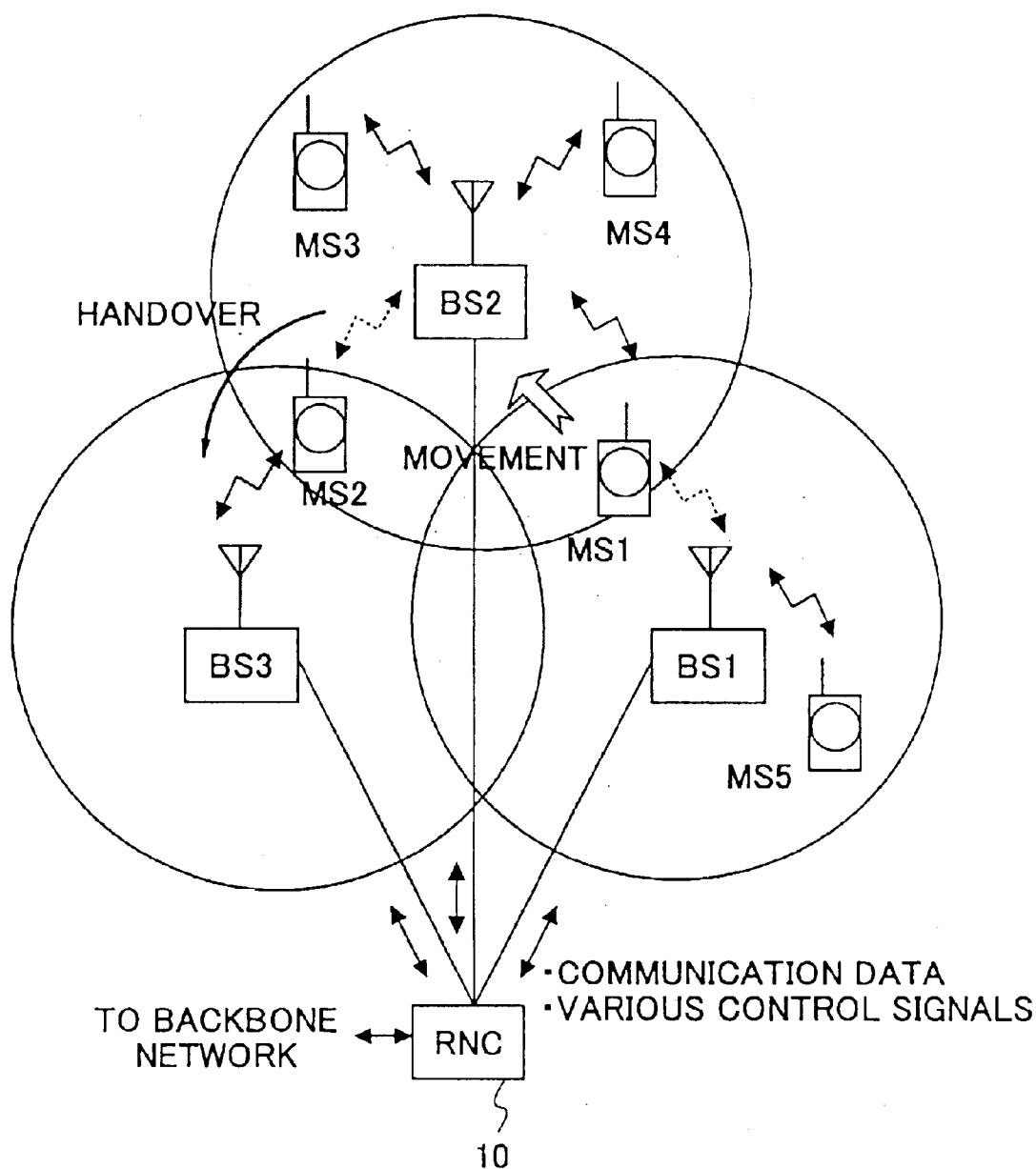
FIG. 9 shows an example of structure of a mobile communications system to which the fifth example of the handover system of the present invention is applied.

The mobile communications system to which the handover system relative to this fifth example is applied is structured as shown in FIG. 9.

In FIG. 9, radio base stations BS1, BS2, and BS3 are connected to the RNC 10, and the RNC 10 is connected to the backbone. By such structure, each of the mobile stations MS1 through MS5 which are located in the communication area of each of the radio base stations BS1, BS2, and BS3 can communicate with terminals in PSTN (Public Switched Telephone Network), ISDN (Integrated Service Digital Network), the Internet, and the like through the radio base stations BS1, BS2, BS3, the RNC 10 and the backbone. While this fifth example illustrates the structure with five mobile stations MS1 through MS5 communicating with the three radio base stations BS1, BS2, and BS3, this is an example and is not specifically limited to it.

Figure 10:
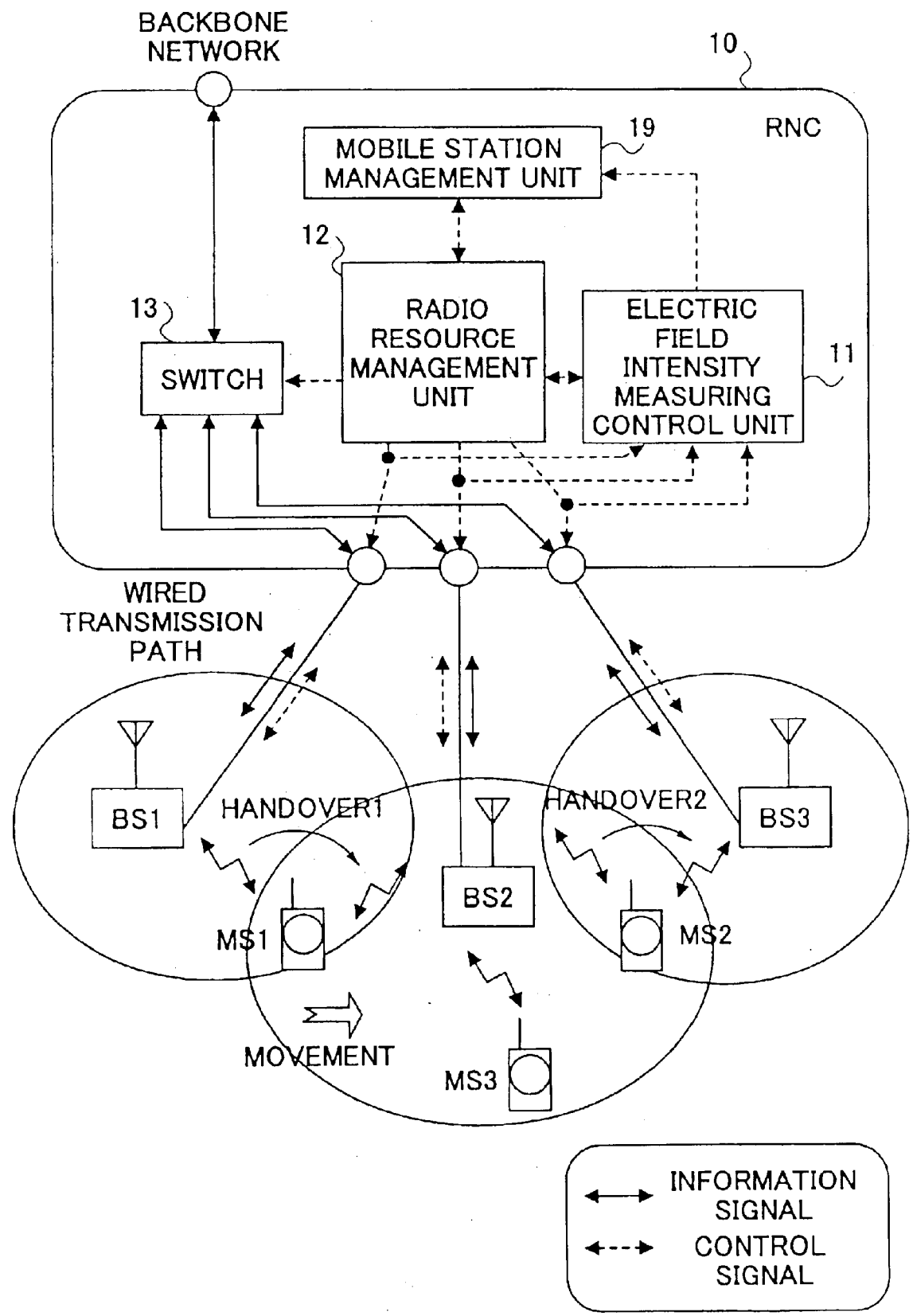
FIG. 10 is a block diagram showing the fifth example of the handover system of the present invention.

The handover system as mentioned above applied to the mobile communications systems is structured as shown in FIG. 10.

In FIG. 10, the RNC 10 has the electric field intensity measurement control unit 11, the radio resources management unit 12, and the switch 13 like the example mentioned above. Further, the RNC 10 is equipped with mobile station management unit 19. The mobile station management unit 19 evaluates combinations of each mobile station and each radio base station which should communicate with each of the mobile stations, using an evaluation point table that is predefined from viewpoints which are mentioned later, such as receiving electric field intensity and required radio resource. In addition, according to the evaluation result, an optimum combination of a mobile station and a radio base station for the handover is selected from the combinations of each mobile station and radio base stations.

A description will follow as regards the handover performed, for example, when the mobile station MS1 which communicates with the radio base station BS1 moves to the communication area of the radio base station BS2 from the communication area of the radio base station BS1, with reference to FIGS. 9 and 10.

Figure 11:
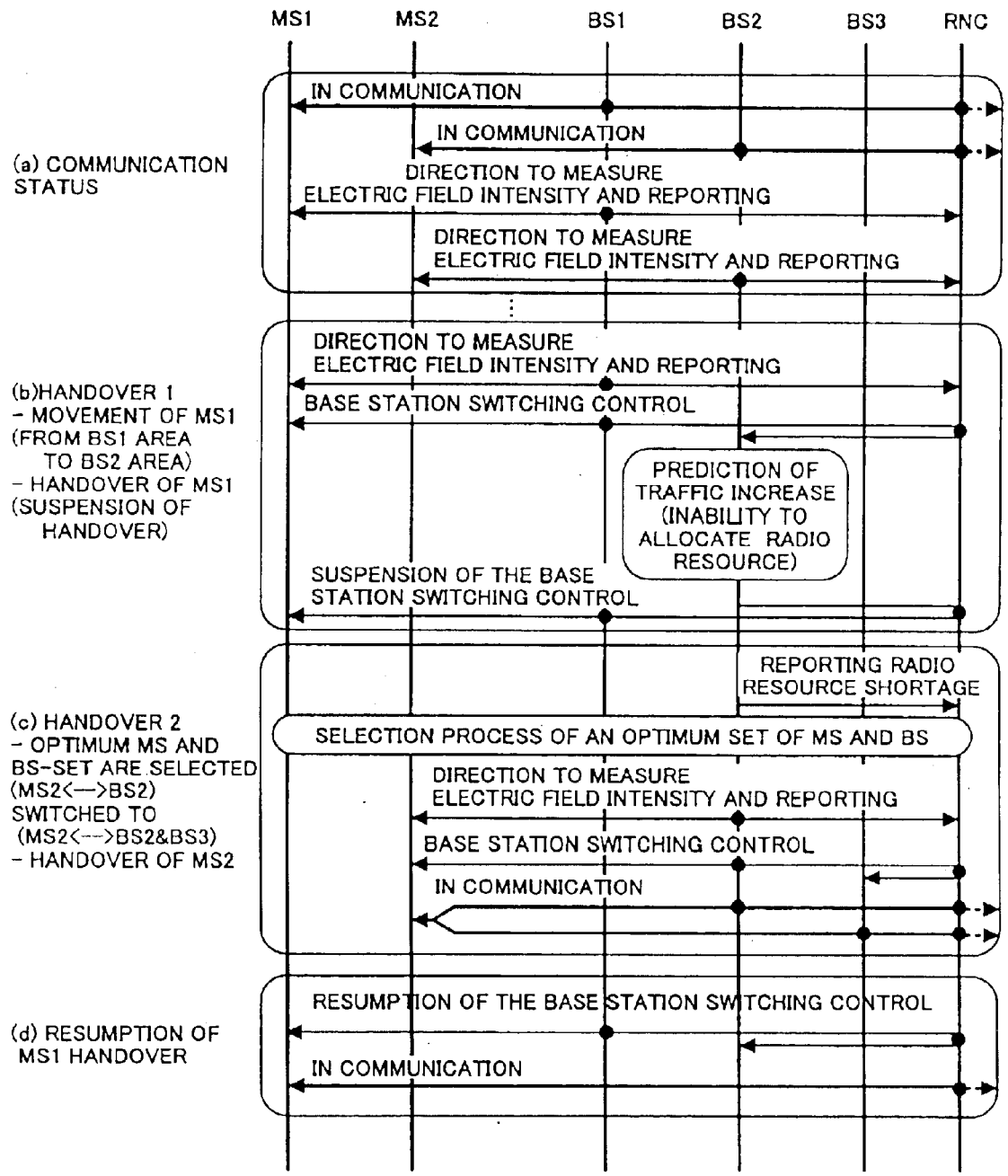
FIG. 11 is a sequence drawing showing an example of the procedure of a handover process.

As shown in FIG. 9, the radio base station BS1 communicates with each of the mobile stations MS1 and MS5 which are currently in its communication area, and the radio base station BS2 is communicating with each of the mobile stations MS2, MS3, and MS4 which are currently in its communication area. In specific reference to the mobile station MS1 and the mobile station MS2, the communication sequence is as shown in FIG. 11, for example.

As shown in FIG. 11(a), where the mobile station MS1 communicates with the radio base station BS1, and the mobile station MS2 communicates with the radio base station BS2, measurement directions for the receiving electric field intensity are transmitted from the electric field intensity measurement control unit 11 in the RNC 10 to each of the mobile stations MS1 and MS2 through each of the radio base stations BS1 and BS2. According to the directions, each of the mobile stations MS1 and MS2 measures the electric field intensity from each of radio base stations which are currently in the vicinity, and report the measured values to the RNC 10 through the radio base stations BS1 and BS2.

The mobile station MS1 communicating with the radio base station BS1 moves to the communication area of the radio base station BS2. In that case, as shown in FIG. 11(b), the measured value of the electric field intensity of the radio base station BS1 and the measured valued of the electric field intensity of the radio base station BS2 which are reported to the electric field intensity measurement control unit 11 of the RNC 10 from the mobile station MS1 are compared. And if the electric field intensity from the radio base station BS2 is higher than the electric field intensity from the radio base station BS1 by a predetermined amount, it triggers the RNC 10 to start the control for switching the communicating counterpart of the mobile station MS1 from the radio base station BS1 to the radio base station BS2 (a handover) (handover 1). However, the situation of the radio base station BS2 is that that a large amount of its radio resource is being used in this case by the communications with the mobile stations MS2, MS3, and MS4. If the radio base station BS2 determines that it will run short of the radio resources for newly assigning communication with the mobile station MS1 (traffic will be congested), a direction is made from the radio base station BS2 to the radio base station BS1 through the RNC 10 to suspend the handover of the mobile station MS1, and the direction is further transmitted to the mobile station MS1 from the radio base station BS1.

Thus, the mobile station MS1 which received the direction to suspend the handover maintains the communication condition with the radio base station BS1. As shown in FIG. 11(c), in this condition, the radio base station BS2 reports to the RNC 10 that it is short of the radio resources. The RNC 10 which received this report performs process for selecting mobile stations which are suitable for handover to the adjacent radio base stations of each of the mobile stations MS2, MS3, and MS4 which are communicating with the radio base station BS2 in order to enable communication between the mobile station MS1 moving into the communication area of the radio base station BS2, and the radio base station BS2. Details of this process will be described later.

When a combination of a mobile station which should carry out handover and a radio base station to which the handover should be carried out is selected, the radio base station in the combination is made to carry out the handover of the mobile station in the selected combination (handover 2). For example, when it is decided that the radio base stations BS2 and BS3 share the communication of the mobile station MS2 at which the handover is carried out (refer to the second example), a link is established between the mobile station MS2 and the radio base stations BS2 and BS3 by the handover processes (electric field intensity measurement and reporting, base station switching control, and the like) of the mobile station MS2. In addition, the mobile station MS2 performs radio communications with the radio mobile stations BS2 and BS3 in parallel, and further communicates with other communication terminals through the RNC 10 and the backbone.

Thus, if part of the radio resources which are needed for communication of the mobile station MS2 is shared by the radio base station BS3 (partial handover of the mobile station MS2), the radio resources for the mobile station MS1 moved to the communication area of the radio base station BS2 communicating with the radio base station BS2 can be secured. In this condition, the RNC 10 will resume the handover process of the mobile station MS1 suspended in the above (refer to (d) in FIG. 12). That is, the RNC 10 directs resumption of the base station switching control to each of the radio base stations BS1 and BS2 and the mobile station MS1. Consequently, the communicating counterpart of the mobile station MS1 is switched from the radio base station BS1 to the radio base station BS2 (handover). Henceforth, the mobile station MS1 communicates with other terminals through the radio base stations BS2, the RNC 10 and the backbone.

Thus, when the mobile station MS1 has moved to the communication area of the radio base station BS2, possibly causing a traffic congestion status at the radio base station BS2, the radio resources for communication between the mobile station MS1 and radio base station BS2 can be secured by making the adjacent radio base station BS3 carry out the handover (also including partial handover) of the mobile station which has already communicated with the radio base station BS2. In addition, by performing the above-mentioned process for other mobile stations in a chain reaction, reliable communication can be given to as many mobile stations as possible.

Figure 12:
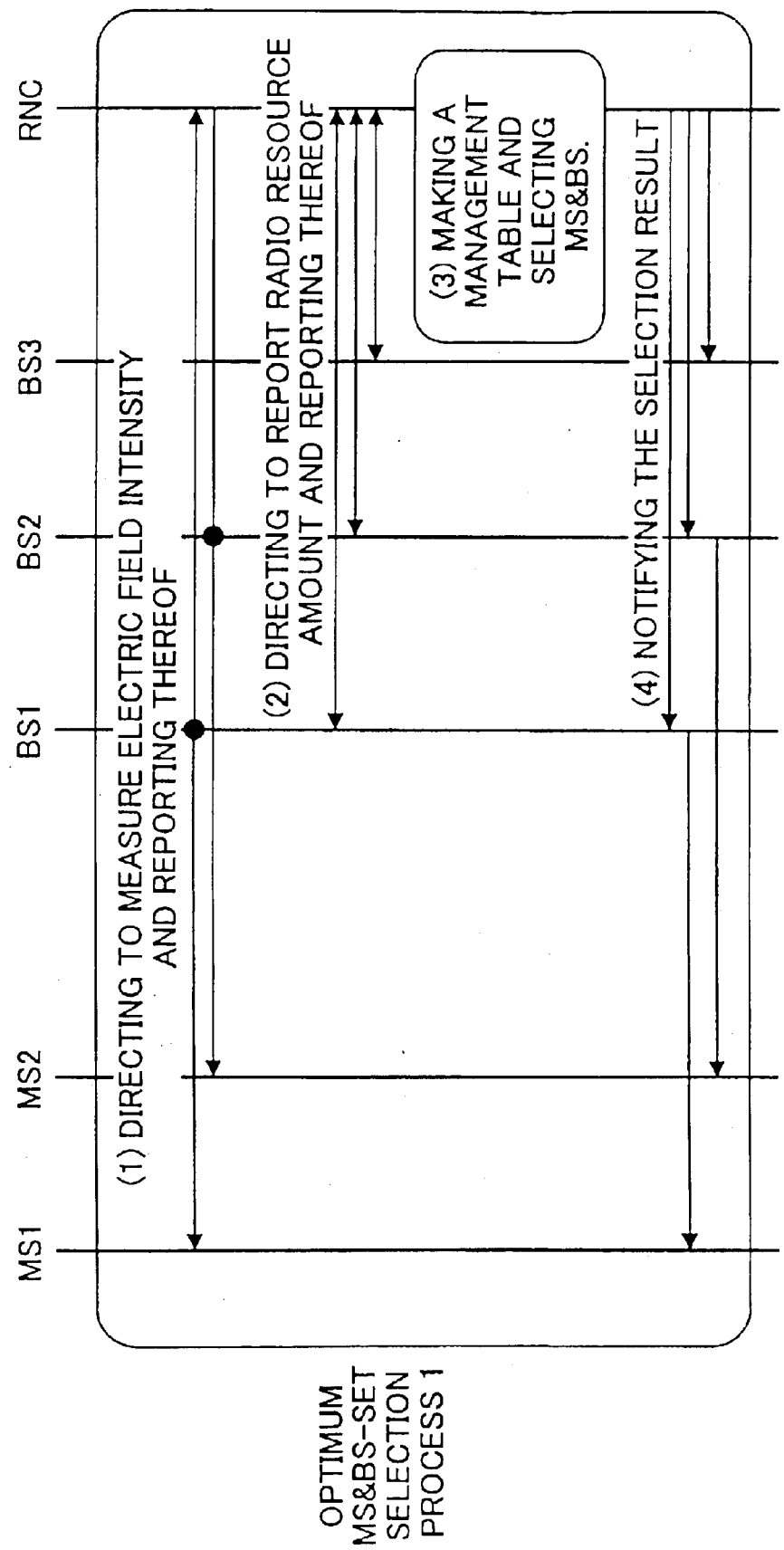
FIG. 12 is a sequence drawing showing an example of the process procedure for selecting the optimum mobile station and a radio base station.

As mentioned above, in order to enable a communication between the mobile station MS1 moved to the communication area of the radio base station BS2, and the radio base station BS2 concerned, the selection process is performed to choose a mobile station suitable for handover to another adjacent radio base station out from the mobile stations MS2, MS3, and MS4 which are already in communication with the radio base station BS2 (referring to drawing 11 (c)), process of which is made according to the procedure specifically shown in FIG. 12.

In FIG. 12, the electric field intensity measurement control unit 11 of the RNC 10 directs subordinate mobile stations to measure the receiving electric field intensity of the radio base station with which the mobile stations are communicating and which are adjacent to them. And each of the mobile stations MS1 and MS2 reports the measured data of the electric field intensity to the RNC 10 via the radio base stations BS1 and BS2, respectively ((1) in FIG. 12).

Further, the radio resources management unit 12 of the RNC 10 directs each of the radio base stations BS1, BS2, and BS3 to report the usage situation of the radio resources. And each of the radio base stations BS1, BS2, and BS3 reports the usage situation of the radio resources to the radio resources management unit 12 of the RNC 10 according to the direction ((2) in FIG. 12).

As the information indicative of the radio resources usage, a ratio of the maximum amount of radio resources permitted for each mobile station communicating with each radio base station, to the radio resources actually occupied by the mobile station, an occupancy rate of the radio resources in each radio base station, and the like can be used, for example.

When the electric field intensity measurement control unit 11 receives the report of the measured value of the electric field intensity from each mobile station as mentioned above and the radio resources management unit 12 receives the report of the radio resources usage situation from each radio base station, the mobile station management unit 19 of the RNC 10 will perform evaluation of combinations of a mobile station and a radio base station serving as a communicating counterpart based on the reported measured values of the electric field intensity, and the radio resources usage situation. In addition, a combination of a mobile station suitable for carrying out handover based on the evaluation and a radio base station as its handover destination is selected ((3) in FIG. 12).

The result of the selection, that is, the combination of the mobile station and the radio base station as the handover destination is notified to each of the radio base stations BS1, BS2, and BS3 from the RNC 10 ((4) in FIG. 12). Subsequently, the handover is carried out for the selected mobile station to the radio base station in the combination (refer to FIG. 11(c)).

Evaluation of the combination mentioned above of the each mobile station and the radio base station serving as a communicating counterpart is made as follows, for example.

Figure 13:
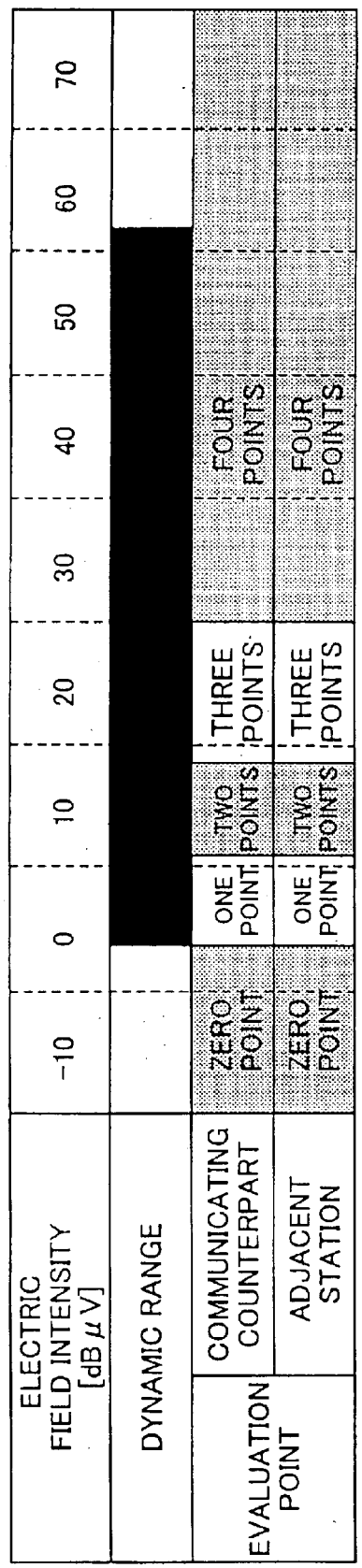
FIG. 13 shows an example (No. 1) of an evaluation point table.

As a communicating counterpart to each mobile station, a radio base station which gives the measured value of receiving electric field intensity as strong as possible is suitable. For a combination of a radio base station $BS_i$ and a mobile station $MS_j$, if the measured value of electric field intensity is $P_{ij}$, the evaluation point is expressed as a function of the measured value $P_{ij}$ of the electric field intensity $f(P_{ij})$. The evaluation point $f(P_{ij})$ is defined based on an evaluation point table as shown in FIG. 13. In the case of this example (refer to FIG. 13), it is supposed that the proper dynamic range of the received electric field in a mobile station is 4 dB$\mu$V–64 dB$\mu$V.

When the measured value $P_{ij}$ of the received electric field from the radio base station $BS_i$ (partner station) which is currently communicating with the mobile station $MS_j$ becomes below the above-mentioned dynamic range, the evaluation point f ($P_{ij}$) is "zero point" (the lowest point), and the evaluation point f ($P_{ij}$) becomes the higher one by one like "one point", "two points", "three points", and "four points" as the measured value $P_{ij}$ of the electric field intensity becomes the higher. Therefore, it indicates that the higher the evaluation point is for the combination of the mobile station $MS_j$ and the radio base station $BS_i$ which is the current communicating counterpart, the more desirable that the communication with this radio base station $BS_i$ is maintained for the mobile station $MS_j$.

On the other hand, if the measured value $P_{ij}$ of the received electric field from a radio base station (adjacent station) $BS_i$ which is adjacent to the radio base station which is currently communicating with the mobile station $MS_j$ becomes below the above-mentioned dynamic range, like the case of the radio base station (partner station) which serves as a communicating counterpart mentioned above, the above-mentioned evaluation point f ($P_{ij}$) is "zero" (the minimum point), and the evaluation point f ($P_{ij}$) becomes the higher one by one like "one point", "two points", "three points", and "four points" as the measured value $P_{ij}$ of the electric field intensity becomes the higher. Therefore, it indicates that the higher the evaluation point becomes for the combination of the mobile station $MS_j$ and the adjacent station $BS_i$, the more desirable becomes the handover of the mobile station $MS_j$ to take place to the adjacent station $BS_j$.

Namely, it indicates that the higher the evaluation point is for a combination of the mobile station $MS_j$ and the radio base station $BS_i$ (whether the partner station or any of adjacent stations), the more it is desirable for the mobile station $MS_j$ to communicate with the radio base station $BS_i$ of the combination.

Figure 14:
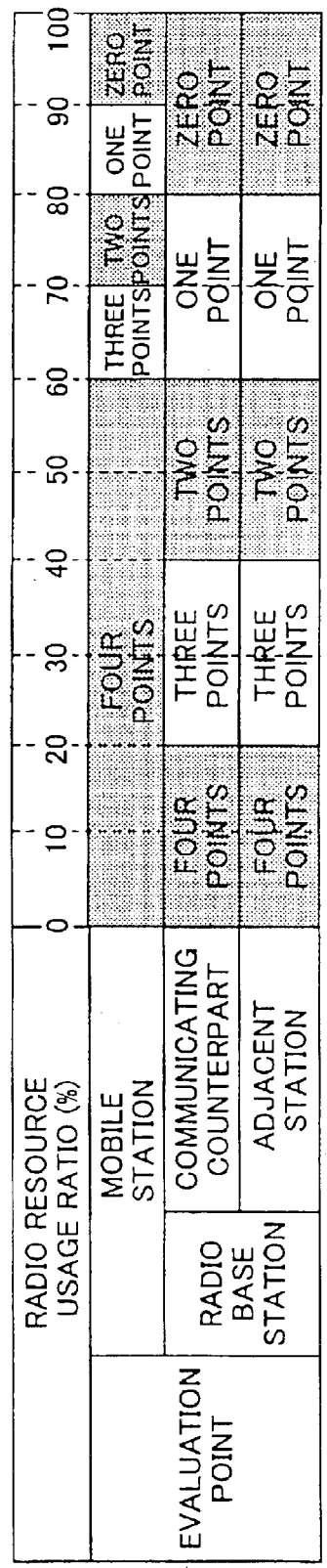
FIG. 14 shows an example (No. 2) of an evaluation point table.

Further, as a communication counterpart of a mobile base station, a radio base station that can provide as much radio resource as possible for the mobile station to occupy is suitable. Therefore, when a ratio of the amount of maximum radio resources permitted to the mobile station $MS_j$ and the radio resources actually occupied by communication is set to $r_j$ in relation to the combination of the radio base station $BS_i$ and the mobile station $MS_j$ and a rate of the radio resources usage in the radio base station $BS_i$ is set to $R_i$, the corresponding evaluation point for each is expressed by functions $g_1$ ($r_j$) and $g_3(R_i)$, respectively. Based on an evaluation point table such as shown in FIG. 14, each of these evaluation points $g_1$ ($r_j$) and $g_2(R_i)$ is defined.

When the ratio $r_j$ (rate of use) of the amount of maximum radio resources permitted to the mobile station $MS_j$ to the radio resources actually occupied by the communication is 0–60%, the evaluation point $g_1$ ($r_j$) is "four points" (the highest score) and the evaluation point $g_1$ ($r_j$) becomes the lower one by one like "three points", "two points", "one point", and "zero point" as the usage rate $r_j$ becomes the larger. When the current traffic amount of the mobile station MS$_j$ is small (the usage rate is small), it is considered that a probability is high for the small amount of the radio resources being available in an adjacent radio base station, and handover of the mobile station MS$_j$ to the adjacent radio base station will be easy. Further, as the transmission speed becomes the higher (the amount of communications increasing), required transmission electric power becomes the larger, and it will be difficult for the mobile station MS$_j$ to communicate with a distant radio base station. Therefore, the higher the evaluation point g$_1$ (r$_j$) is, it indicates a situation that the more it is suitable for carrying out the handover of the mobile station MS$_j$ to the adjacent station.

When the usage rate R$_i$ of the radio resources in the radio base station (partner station) BS$_i$ which is performing the current communication with the mobile station becomes 0–20%, the evaluation points g$_2$ (R$_i$) is "four points" (the highest score), and the evaluation point g$_2$ (R$_i$) becomes the higher one by one like "one point", "two points", "three points", and "four points" as the usage rate R$_i$ becomes the larger. Therefore, the higher the evaluation point g$_2$ (R$_j$) is, there is the more margin in the radio resources in the radio base station (partner station) BS$_i$ which is communicating with the mobile station, indicating that the combination of the mobile station and the radio base station BS$_i$ is suitable for communication.

On the other hand, if the R$_i$ of a radio base station (adjacent station) BS$_i$ which is adjacent to the radio base station which is communicating with the mobile station also falls between 0% and 20%, the evaluation point g$_2$ (R$_i$) is "four points" (the highest score), and the evaluation point g$_2$ (R$_i$) becomes the smaller one by one like "three points", "two points", "one point", and "zero point" as the usage rate R$_i$ becomes the larger. Therefore, the higher the evaluation point g$_2$ (R$_i$) is, the larger is the amount of the margin in the radio resources in the radio base station BS$_i$ which is adjacent to the radio base station communicating with the mobile station, and it indicates that the combination of the mobile station and the adjacent station BSi is in a suitable situation for communication, i.e., it is desirable to handover the mobile station from the radio base station currently communicating to the adjacent radio base station.

When the margin amount of the radio resources is small in both the radio base station (partner station) and the radio base station (adjacent station) adjacent to the partner station serving as a communicating counterpart of a mobile station, there is a case where the mobile station may communicate by establishing links with a plurality of radio base stations. In consideration of this type of the situation, the mobile station management unit 19 evaluates combinations as mentioned above of a mobile station and a radio base station, in addition, gives an evaluation point D about combinations of a mobile station and one or more radio base stations to be linked. The evaluation point D is defined based on an evaluation point table as shown in FIG. 15, for example.

As for a mobile station, it is desirable to maintain the ongoing communication with the radio base station as much as possible, and even if it is the case where the communicating counterpart of the mobile station is switched to other radio base stations, the number of the radio base stations for switching is desired to be as small as possible for ease of controlling and the like. From such a viewpoint, the evaluation point is defined as shown in FIG. 15.

In FIG. 15, when the mobile station maintains the communication with the radio base station (own station) with which a communication is ongoing, that is, a handover of the mobile station will not take place, the highest evaluation point of "five points" is given. In addition, the evaluation point becomes lower as the number of the radio base stations after switching the communicating counterpart of a mobile station increases. And where the communicating counterpart for the mobile station is switched to a plurality of radio base stations (two, three, and more than it), the evaluation point will be higher when the radio base station (own station) which is performing the current communication is included in the radio base stations after the switching than when it is not included.

The mobile station management unit 19 performs a process for selecting a combination of a mobile station and a radio base station suitable for the mobile station for newly communicating after carrying out handover based on each evaluation point as mentioned above of the combinations of a mobile station and a radio base station. This process is performed as follows, for example.

First, an evaluation point y$_{ij}$ about the mobile station MS$_j$ communicating with the radio base station BS$_j$ after handover, i.e., the evaluation point y$_{ij}$ for the combination of the mobile station MS$_j$ and the radio base station BS$_i$, using each evaluation points f (P$_{ij}$), g$_1$ (r$_j$) and g$_2$ (R$_i$) mentioned above is calculated according to the formula presented below.

$$y_{ij}=\alpha f(P_{ij})+\beta g_1(r_j)+\gamma g_2(R_i) \quad (1)$$

In the above-mentioned formula (1), α, β, and γ are weighting constants predefined based on required conditions of a system.

Further, a final evaluation point z for the combination of the mobile station MS$_j$ and the radio base station $_i$ is calculated using the above-mentioned evaluation point D (refer to FIG. 15)

$$Z=y_{ij}+\epsilon D \quad (2\text{-}1)$$

And, for example, as shown in FIG. 16, each evaluation value which is calculated according to the above formula (2-1) is summarized in the management table format for each of the combinations of MS2, MS3 and MS4 that are communicating with the radio base station BS2 that will become congested, and the mobile station MS1 that has entered into the communication area of the radio base station BS2 and the radio base stations BS2, BS1, BS3 and so on.

Further, the evaluation point z about the combination of the mobile station MS$_j$ and two radio base stations BS$_{i1}$ and BS$_{i2}$ and the combination of the mobile station MS$_j$ and three radio base stations BS$_{i1}$, BS$_{i2}$, and BS$_{i3}$ are calculated according to the formula in below, respectively.

$$z=(y_{i1j}+y_{i2j})/2+\epsilon D \quad (2\text{-}2)$$

$$z=(y_{i1j}+y_{i2j}+y_{i3j})/3+\epsilon D \quad (2\text{-}3)$$

In the above-mentioned formulae (2-2) and (2-3), ε is a weighting constant. Further, each of the above-mentioned radio base stations BS$_{i1}$, BS$_{i2}$, and BS$_{i3}$ is selected in the descending order of the magnitude of the value y$_{ij}$ that is calculated as above to the radio base station combined with the mobile station MS$_j$.

The evaluation points z calculated as above for combinations of each mobile station MS$_j$ and a plurality (2 or 3) of the radio base stations are added to the management table as shown in FIG. 16.

When the management table is completed as mentioned above, the combination of the mobile station which should carry out handover and the radio base station of the handover destination will be selected with reference to the management table.

For example, with reference to the management table shown in FIG. 16, combinations of the mobile station $BS_j$ and the radio base station $BS_i$ are searched one by one in the descending order of the evaluation point z, and the combination with the highest evaluation point, other than the combination of the mobile station and radio base station which are currently communicating, is selected from the combinations. This means that the most suitable combination for communication between the mobile station and radio base station in the combinations other than the combination of the mobile station and radio base station which are performing the current communication is selected. As a result of selecting the combination of the mobile station and radio base stations as mentioned above, in this example, the combination of the mobile station MS2 and the radio base stations BS2 and BS3 is selected.

When the selection of the combination of the mobile station MS2 and the radio base stations BS2 and BS3 is made as mentioned above, the handover process is executed based on directions from the RNC 10 as mentioned above (refer to FIG. 11(c)). Consequently, the communicating counterpart of the mobile station MS2 which was communicating with the radio base station BS2 is switched to the radio base stations BS2 and BS3 (partial handover).

Although the example mentioned above described the case where the radio resources in the radio base station BS2 will run short when the mobile station MS1 moves into the communication area of the radio base station BS2 (traffic congestion), similar process can be performed when an amount of data communications of any of the mobile stations MS2, MS3, and MS4 which are communicating with the radio base station BS2 increases or when a new mobile station start communication with the radio base station BS2, causing a shortage of the radio resources in the radio base station BS2.

Further, although the number of the combinations of the mobile stations and radio base stations which are selected was one in the example mentioned above, it is not limited to that. A plurality of combinations of mobile stations and radio base stations that become the communicating counterpart may be selected. In this case, the combinations are selected in the descending order of the evaluation point as mentioned above. The number of the combinations can be defined based on a relationship between an available amount of the radio resources in the radio base station, and the radio resources required by a mobile station which newly starts communication (by handover or a new call), and by a mobile station where the amount of data communications increased rapidly in the communication with the radio base station.

Further, the sixth example of the handover system concerning the implementation mode of the present invention will be described. In the sixth example, each mobile station autonomously switches the radio base station serving as the communicating counterpart (a handover) based on communication conditions. For this purpose, each mobile station has the similar function as the mobile station management unit 19 provided in the RNC 10 mentioned above.

In the sixth example of the handover system, a process is performed according to a procedure as shown in FIG. 17, for example.

In FIG. 17, the radio resources management unit 12 of the RNC 10 requires a report about the availability (or usage) of radio resources from each of the radio base stations BS1, BS2, and BS3 (1). Each of the radio base stations BS1, BS2, and BS3 reports the availability of the radio resources to the radio resources management unit 12 of the RNC 10, responding to the demand (1).

The radio resource management unit 12 reports the information about the availability of the radio resources in each of the reported radio base stations BS1, BS2, and BS3 to each of the serving mobile stations, e.g., the mobile stations MS1 and MS2 through the radio base stations BS1 and BS2 (2).

Each of the mobile stations MS1 and MS2 measures the receiving electric field intensity from radio base stations that are adjacent to the radio base stations BS1 and BS2, respectively, under current communication. And based on the availability of the radio resources in the radio base stations which are adjacent to the radio base station under current communication notified as mentioned above, and the measured receiving electric field intensity mentioned above, each of the mobile stations MS1 and MS2 calculates the evaluation point that indicates the degree of the suitableness of each radio base station for a communicating counterpart to the mobile station concerned, like the example mentioned above (3). The calculation method is the same as the method mentioned in the fifth example mentioned above (a function of the mobile station management unit 19). Each of the mobile stations MS1 and MS2 further creates a management table as shown in FIG. 16 that describes the evaluation points for the combinations of the mobile station concerned and each of the radio base stations which are calculated as mentioned above (4).

A notice to each of the mobile stations MS1 and MS2 of the information about the available radio resources in each above-mentioned radio base station is made at an every predetermined interval. And whenever each of the mobile stations MS1 and MS2 receives the notice, it updates the evaluation point described in the management table mentioned above based on the notified information and the measured value of the receiving electric field intensity from each radio base station. If the communication traffic in a certain radio base station increases and it will be in a traffic congestion condition, the evaluation point of a mobile station which communicates with the radio base station for a combination with one or more other radio base stations becomes higher than the evaluation point of the combination with the radio base station under current communication. When the difference of those evaluation points exceeds the predetermined standard, the one or more radio base stations concerned are selected as the communicating counterpart of the mobile station concerned (3).

Then, the mobile station autonomously switches itself to the radio base station of the selected combination as the communicating counterpart as mentioned above (handover) (4). Henceforth, the mobile station communicates with other terminals through the switched radio base station, the RNC 10, and the backbone.

In such a handover system as above, each mobile station manages the evaluation about the combination with the radio base station under current communication, and other combinations with one or more radio base stations, and each mobile station switches its communicating counterpart autonomously based on the situation managed. Accordingly, the RNC 10 does riot have to manage the evaluation point of the combinations of each serving mobile station and radio base stations centrally, and the process load of the RNC 10 is mitigated.

Further, the seventh example of the handover system concerning the implementation mode of the present invention will be described. In the seventh example, each mobile station switches the radio base station as its communicating counterpart (handover) by an autonomous control based on communication conditions, similarly to the sixth example mentioned above. In this example, each mobile station chooses a radio base station as a new communicating counterpart without making a management table (referring to FIG. 16) as mentioned above.

Here a case is assumed, for example, where communication data of a mobile station which communicates with a certain radio base station increased rapidly, and the radio base station concerned turns into a traffic congestion condition.

Figure 18:
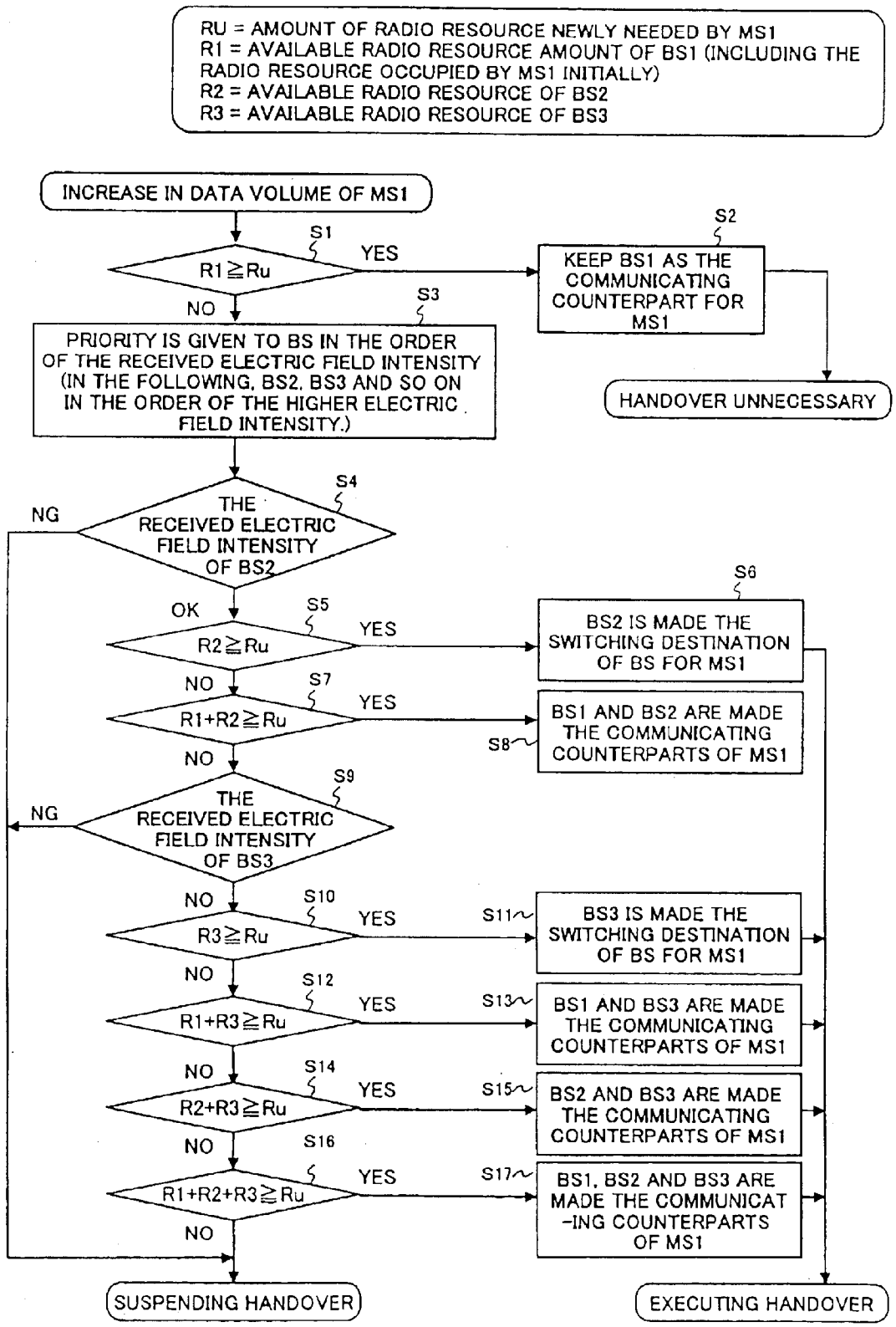
FIG. 18 is a flowchart which shows an example of the process procedure for selecting the optimum mobile station and a radio base station in the seventh example of the handover system of the present invention.

Each mobile station processes according to the procedure shown in FIG. 18.

For example, the case where the communication data of the mobile station MS1 which communicates with the radio base station BS1 increases rapidly, and the radio base station BS1 concerned is in traffic congestion is assumed. In this case, the mobile station MS1 compares an amount of the radio resources Ru which is newly needed for the increased amount of communication data with an amount of the available radio resources R1 in the radio base station BS1 reported from the RNC 10 as mentioned above (S1). If the result of the comparison is that the amount of the available radio resources R1 in the radio base station BS1 is larger than the amount of the radio resources Ru that is newly needed as mentioned above (YES in S1), the mobile station MS1 will maintain the communication condition with the radio base station BS1 (S2), that is, the handover of the mobile station MS1 is not made in this case.

On the other hand, it the amount R1 of the available radio resources in the above-mentioned radio base station BS1 is smaller than the radio resources amount Ru that is newly needed for the data communications by the mobile station MS1 as mentioned above (it represents NO in S1), the mobile station MS1 measures the receiving electric field intensity from the radio base stations BS2 and BS3 that are adjacent to the radio base station BS1 (S3). In addition, priority of the adjacent radio base stations is decided according to the magnitude of the receiving electric field intensity.

The mobile station MS1 first determines whether the electric field intensity from a radio base station, BS2 for example, that ranks the highest priority (providing the highest receiving electric field intensity) is sufficient for communication (S4). If the electric field intensity is not sufficient for communication (it is NG in S4), the mobile station MS1 will maintain the communication with the radio base station BS1 (handover suspended). In this case, the radio base station BS1 assigns radio resources to the communication for the mobile station MS1 within the limit of the available radio resource R1.

On the other hand, if the electric field intensity from the radio base station BS2 is enough for communication (OK in S4), the mobile station MS1 will determine further whether an amount R2 of the available radio resources of the radio base station BS2 reported from the RNC 10 as mentioned above is larger than the amount Ru of the radio resources that is newly needed by the mobile station MS1 concerned (S5). If the amount R2 of available radio resources of this radio base station BS2 is larger the amount Ru of the radio resources newly needed by the mobile station MS1 (YES in S5), the mobile station MS1 will nominate the radio base station BS2 as a communicating counterpart (S6). The communicating counterpart of the mobile station MS1 is switched from the radio base station BS1 to the radio base station BS2 by the switching control of the RNC 10 based on the nomination (handover is carried out).

Further, if the amount R2 of available radio resources of the radio base station BS2 is smaller than the amount Ru of radio resources which is newly needed by the mobile station MS1 (NO in S5), the mobile station MS1 determines whether the total amount of available radio resources R1 and R2 of the radio base stations BS1 and BS2, respectively, (R1+R2) is larger than the amount Ru of [the radio] unrelated resources that is newly needed by the mobile station MS1 concerned (S7). If the total amount (R1+R2) is larger than the amount Ru of radio resources newly needed by the mobile station MS1 concerned (YES in S7), the mobile station MS1 nominates the two radio base stations BS1 and BS2 as the communicating counterparts (S8). The communicating counterpart of the mobile station MS1 is switched from one station of the radio base station BS1 to two stations of the radio base stations BS1 and BS2 by the switching control of the RNC 10 based on the nomination (partial handover is carried out).

On the other hand, if the total of the amounts R1 and R2 (R1+R2) of the available radio resources of the both above-mentioned radio base stations BS1 and BS2 is smaller than the amount Ru of radio resources newly needed by the mobile station MS1 concerned (NO in S7), the mobile station MS1 determines whether the electric field intensity from the radio base station BS3, for example, where the priority is high (receiving electric field intensity is high), having given the highest electric field intensity next to the radio base station BS2, gives sufficient electric field intensity for communications (S9). If the electric field intensity is not enough for communications (NG in S9), the mobile station MS1 will maintain communication with the radio base station BS1 like an above-mentioned case (NG in S4) (handover suspended).

If the electric field intensity from the above-mentioned radio base station BS3 is enough for communications with the mobile station MS1 (OK in S9), the mobile station MS1 concerned will determine further whether the amount R3 of available radio resources in the radio base station BS3 reported from the RNC 10 as mentioned above is larger than the amount Ru of radio resources newly needed (S10). If the amount R3 of the available radio resources in the radio base station R3 is larger than the amount Ru of radio resources newly needed by the mobile station MS1 (YES in S10), the mobile station MS1 nominates the radio base station BS3 as the communicating counterpart (S11). The communicating counterpart of the mobile station MS1 is switched from the radio base station BS1 to the radio base station BS3 by the switching control of the RNC 10 based on this nomination (handover is carried out).

If, on the other hand, the amount R3 of the available radio resources of the radio base station BS3 is smaller than the newly needed amount Ru by the mobile station MS1 (NO in S10), the mobile station MS1 determines whether the total amount of R1 and R2 of the available radio resources of the radio base stations BS1 and BS3 (R1+R3) is larger than the amount Ru of [the radio] unrelated resources newly needed by the mobile station MS1 concerned (S12). If the total amount (R1+R3) is larger than the amount Ru of radio resources newly needed by the mobile station MS1 concerned (YES in S12), the mobile station MS1 nominates the two radio base stations BS1 and BS3 as the communicating counterpart (S13). The communicating counterpart of the mobile station MS1 is switched from one station of the radio base station BS1 to two stations of the radio base stations BS1 and BS3 by the switching control of the RNC 10 based on this nomination (partial handover is carried out).

If the total amount of the amounts R1 and R3 of the available radio resources of the both of the above-mentioned radio base stations BS1 and BS3 (R1+R3) is smaller than the amount Ru of radio resources which is newly needed by the mobile station MS1 concerned (NO in S12), the mobile station MS1 determines whether a total of the amounts R2 and R3 of available radio resources of the two radio base stations BS2 and BS3 adjacent to the radio base station BS1 (R2+R3) is larger than the amount Ru of radio resources newly needed by the mobile station MS1 concerned (S14). If the total amount (R2+R3) is larger than the amount Ru of radio resources that is newly needed as mentioned above (YES in S14), the mobile station MS1 will nominate the two radio base stations BS2 and BS3 as the communicating counterpart (S15). The communicating counterpart of the mobile station MS1 is switched to the two stations of the radio base stations BS2 and BS3 from the radio base station BS1 by the switching control of the RNC 10 based on this nomination (handover to two or more stations).

Further, when the total amount R2 and R3 (R2+R3) of the available radio resources of the both radio base stations BS2 and BS3 mentioned above is smaller than the amount Ru of radio resources newly needed by the mobile station MS1 concerned (NO in S14), the mobile station MS1 determines whether a total amount of radio resources R1, R2, and R3 of three radio base stations BS1, BS2, and BS3 (R1+R2+R3) is larger than the amount Ru of radio resources which is newly needed by the mobile station MS1 concerned (S16). If the total amount (R1+R2+R3) is larger than the amount Ru of radio resources newly needed by the mobile station MS1 concerned (YES in S16), the mobile station MS1 will nominate the three radio base stations BS1, BS2, and BS3 as the communicating counterpart (S17). The communicating counterpart of the mobile station MS1 is switched from one station of the radio base station BS1 to three stations of the radio base stations BS1, BS2, and BS3 by the switching control of the RNC 10 based on this specification (partial handover).

If, on the other hand, there are no other adjacent radio base stations when the total amount of the radio resources (R1+R2+R3) mentioned above is smaller than the amount Ru of radio resources newly needed by the mobile station MS1 concerned (NO in S16), the mobile station MS1 will maintain communication with the radio base station BS1 like the case (NG in S4 and NG in S9) mentioned above (handover suspended).

The above process is performed by the mobile station when the amount of data communications of the mobile station which is communicating with the radio base station increases rapidly. Therefore, when a mobile station under communication enters into the communication area of a certain radio base station, the radio base station concerned may turn into a traffic congestion condition, then it is uncertain which mobile station that is communicating with the radio base station concerned should execute the process relative to the handover according to the procedure mentioned above (refer to FIG. 18). Then, by providing the mobile station management unit 19 in the RNC 10 as mentioned above, a suitable mobile station can switch radio base stations for the communicating counterpart by autonomous control based on communication situations in the case mentioned above.

For example, when a mobile station advances into the communication area, all the mobile stations that are already in communication with the radio base station which will be in a traffic congestion condition measure the receiving electric field intensity from the radio base station concerned, and each mobile station reports the measured value to the mobile station management unit 19 of the RNC 10. The mobile station management unit 19 gives a priority in an ascending order of the reported low receiving electric field intensity of each mobile station. In addition, the mobile station management unit 19 directs to perform the handover process to the mobile station of the highest priority (receiving electric field intensity being the lowest). The directed mobile station executes the handover process according to the procedure as shown in FIG. 18. The radio resources amount Ru is equal to the amount of radio resources which the specified mobile station is presently using in this case.

If the amount of the radio resources made available by the handover of the mobile station mentioned above is not large enough to reach the amount of radio resources which is to be used by a mobile station which advances into the communication area, or the handover of the mobile station specified to carry out the handover as mentioned above was not possible, an handover direction is issued to a mobile station of the next priority (the receiving electric field intensity being the second lowest) to carry out the handover process according to the procedure shown in FIG. 18. In addition, the process for nominating a mobile station and executing the handover at the nominated mobile station is repeatedly performed until the amount of radio resources made available reaches the amount of radio resource to be used by the mobile station that advances into the communication area.

In the following, the eighth example of the handover system relative to the implementation mode of the present invention will be described.

In this example, verification is performed as to whether the communication situation at the mobile station which carried out the handover is suitable after the handover of the mobile station is carried out according to each example mentioned above.

Figure 19:
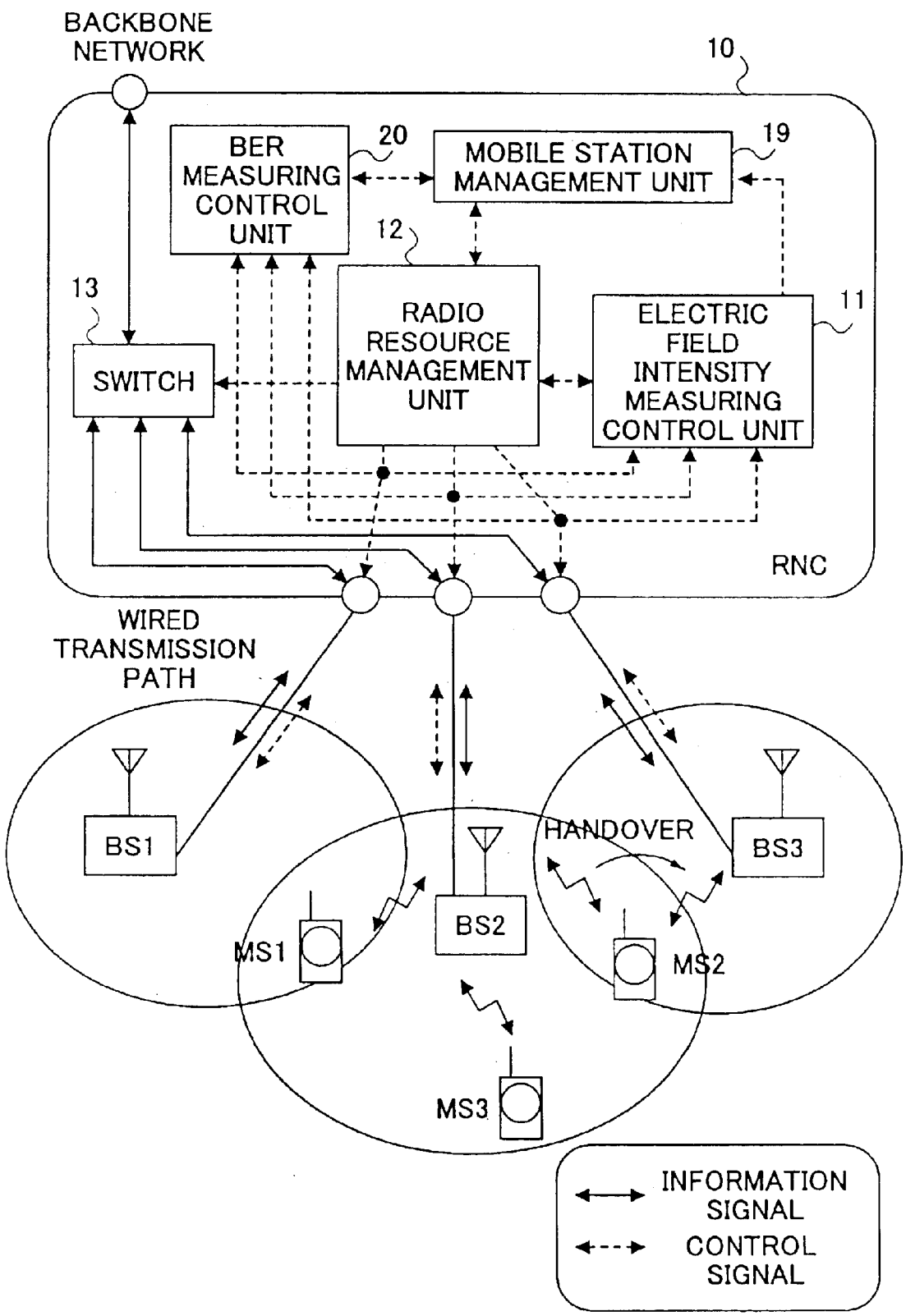
FIG. 19 is a block diagram showing the eighth example of the handover system of the present invention.

The handover system concerning this example is structured as shown in FIG. 19.

In FIG. 19, the RNC 10 includes the electric field intensity measurement control unit 11, the radio resources management unit 12, the switch 13, and the mobile station management unit 19 like the fifth example mentioned above (refer to FIG. 10). The RNC 10, further, includes a BER (Bit Error Rate) measuring control unit 20. Each of the mobile stations MS1, MS2, and MS3 is equipped with a BER measuring instrument for measuring an error rate (BER) of an error in communication with a radio base station.

Figure 20:
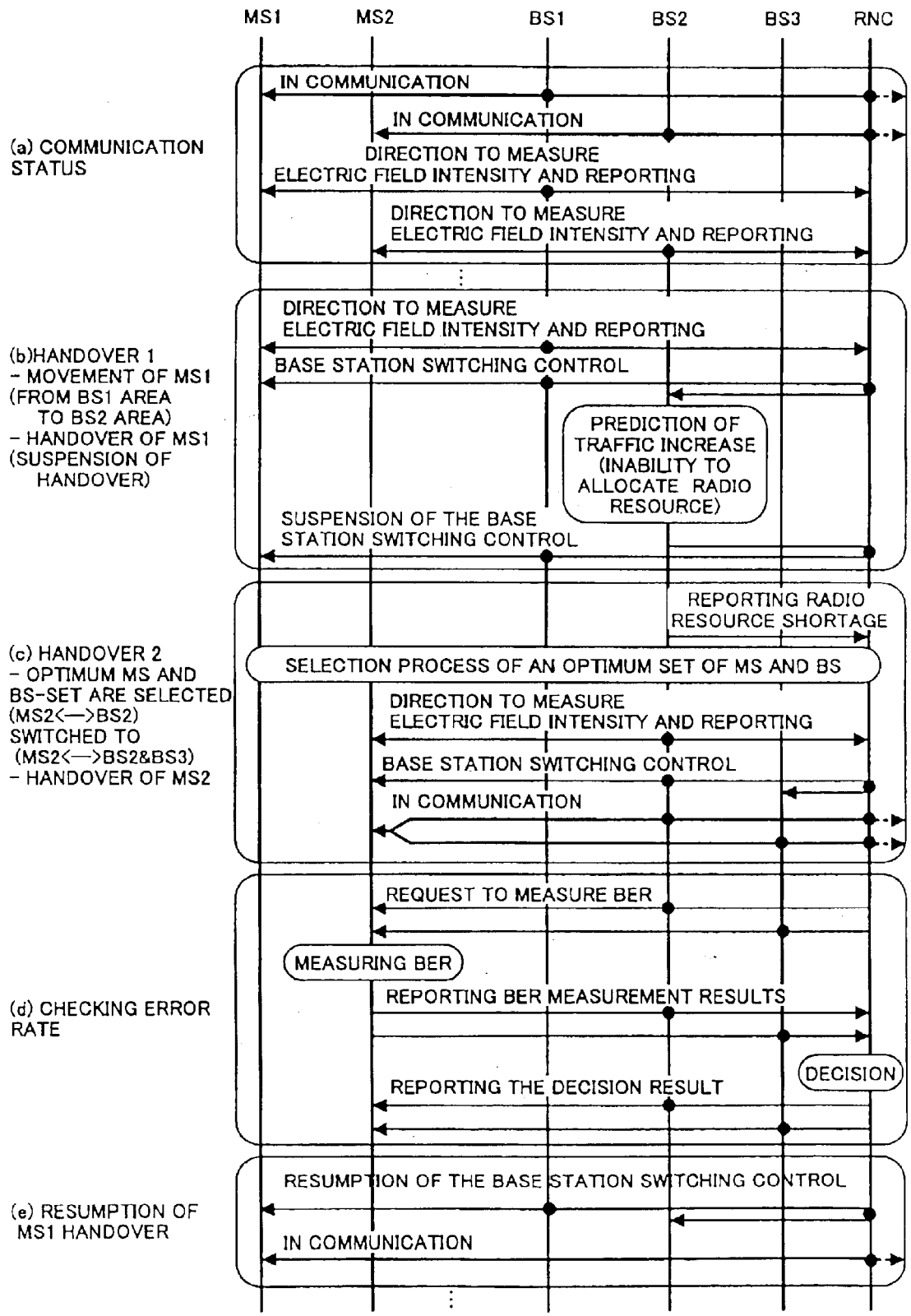
FIG. 20 is a sequence drawing showing an example of the procedure of handover process.
Figure 21:
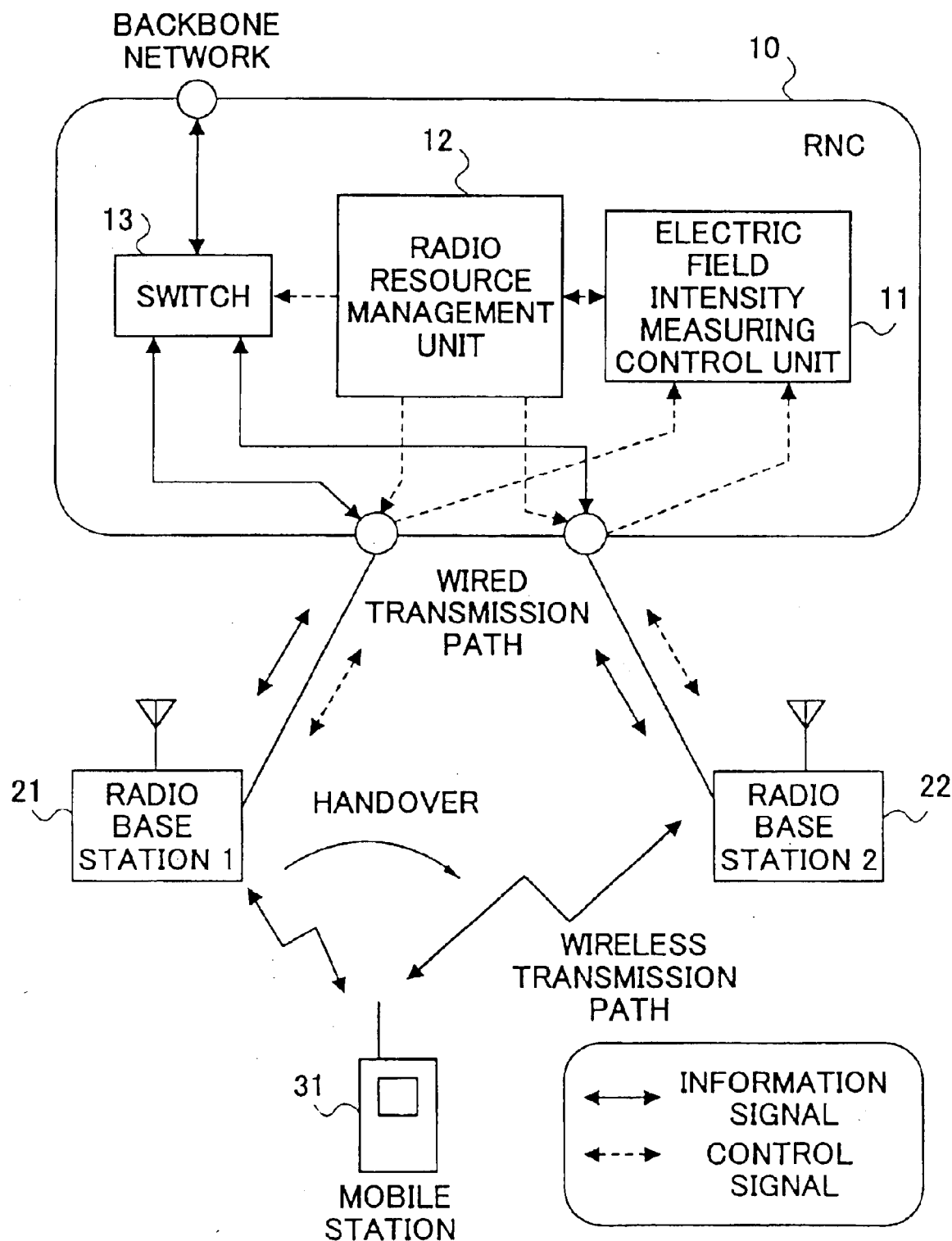
FIG. 21 is a block diagram showing a conventional example.
Figure 22:
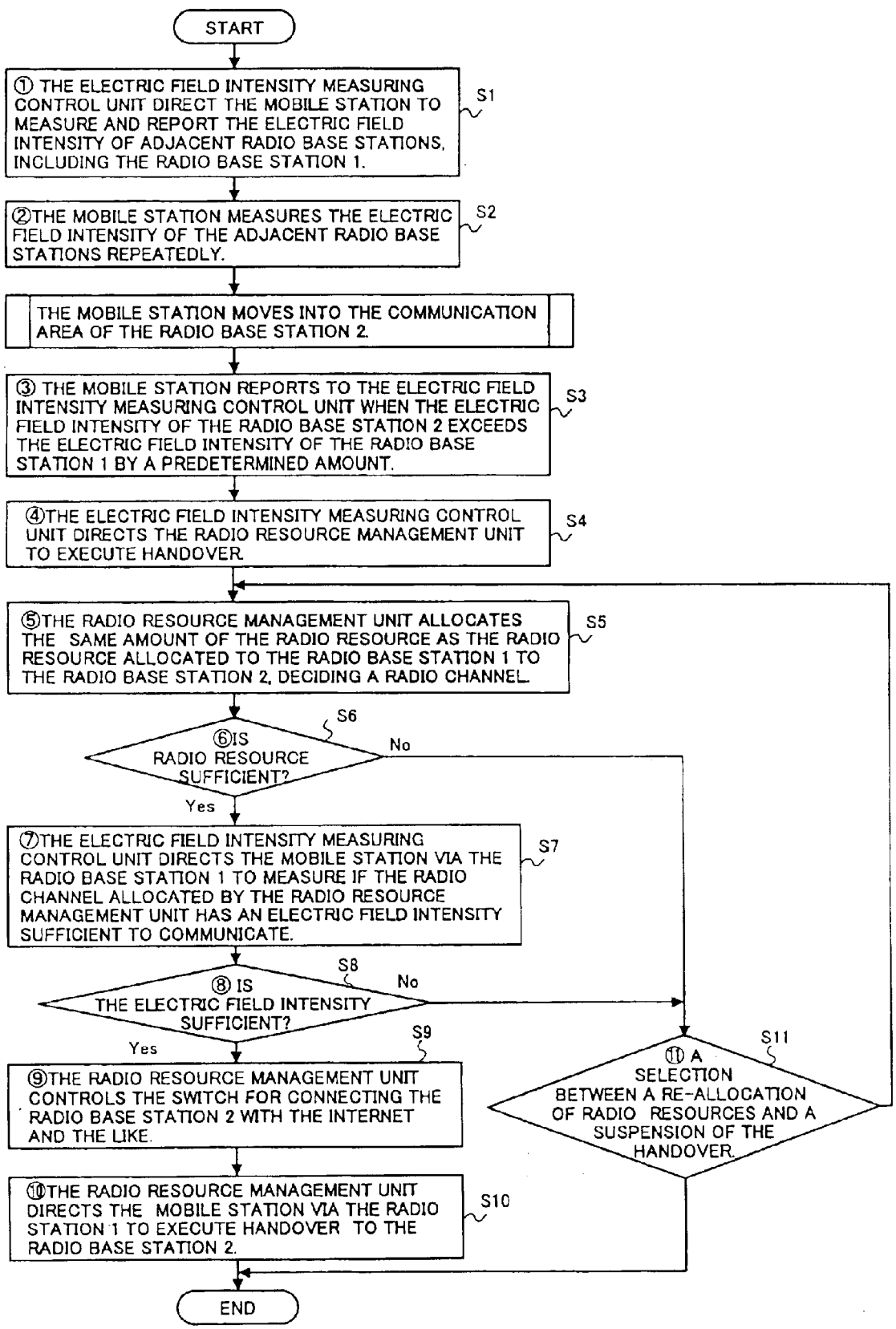
FIG. 22 shows the operation flow of the conventional example.

In this example, process is performed according to the procedure shown in FIG. 20.

If the radio base station BS2 becomes in a traffic congestion condition by the handover of the mobile station MS1 which has been communicating with the radio base station BS1, handover of the mobile station MS2 which was communicating with the radio base station BS2 which becomes in the traffic congestion condition will be carried out according to procedures similar to the procedures (a), (b), and (c) shown in FIG. 11. Consequently, the communicating counterpart of the mobile station MS2 is switched from one station of the radio base station BS2 to two stations of the radio base stations BS2 and BS3.

If the communicating counterpart of the mobile station MS2 is switched to the radio base stations BS2 and BS3 in this manner, the error rate in the communication of this mobile station MS2 will be checked (refer to (d) of FIG. 20). That is, the BER measuring control unit 20 of the RNC 10 directs the mobile station MS2 via each of the radio base stations BS2 and BS3 to measure the error rate. If the mobile station MS2 receives the direction, the BER measuring instrument will measure the error rate in communication with each of the radio base stations BS2 and BS3 according to the direction. In addition, the mobile station MS2 reports the measured error rate to the BER measuring control unit 20 of the RNC 10.

The BER measuring control unit 20 will determine whether the error rate is below a standard value when the error rate report is received from the mobile station MS2. If the error rate is below the standard value, a notice that the handover was carried out successfully is given to the mobile station MS2 from the BER measuring control unit 20 via the radio base stations BS2 and BS3. On the other hand, if the error rate exceeds the fixed value, the BER measuring control unit 20 directs the mobile station management unit 19 to start the procedure for selecting a combination of a mobile station for handover and the radio base station which serves as the communicating counterpart, noting that the combination of the mobile station MS1 and the radio base station which serves as the communicating counterpart is unsuitable. Then, selection of a combination of the mobile station which should carry out handover and the radio base station as the handover destination according to the procedure (refer to FIG. 12) mentioned above is made again under the control of the mobile station management unit 19. In addition, the handover is carried out for the selected mobile station to the radio base station that is paired therewith.

When the handover process of a mobile station which was communicating with the radio base station BS2 to an adjacent radio base station is performed and a check result of the communication after the handover is proper as described above, the handover of the mobile station MS1 from the radio base station BS1 to the radio base station BS2 resumes (refer to (*e*) of FIG. 20)

As described above, according to the present invention, the handover of a mobile station can be carried out to other radio base stations where traffic is not congested when a certain radio base station is experiencing a traffic congestion, thereby enabling to provide an effective use of radio resources in the whole mobile communications network. Further, since the minimum data-transmission capacity or the minimum throughput of a user request can be secured, it becomes possible to enhance user conveniences.

What is claimed is:

1. A handover control method that switches a radio base station serving as a communicating counterpart of a mobile station comprising:
    detecting that said radio base station fails to provide a predetermined minimum bandwidth for said mobile station due to increasing shortage of radio resources; and
    switching the communicating counterpart of the mobile station from said radio base station to another radio base station in response to the detection at said detecting step.

2. A handover control method that switches a radio base station serving as a communicating counterpart of a mobile station, comprising:
    detecting that the mobile station becomes incapable of communicating by using the predetermined minimum bandwidth;
    selecting one or more radio base stations based on transmission capacity of the radio base stations such that a totality of said one or more radio base stations provide a total data transmission capacity satisfying the predetermined minimum bandwidth; and
    switching the communicating counterpart of the mobile station from said ratio base station to said one or more base stations in response to the detection at said detecting step so that the mobile station communicates with said one or more base stations simultaneously.

3. The handover control method as claimed in claim 1 or 2, wherein
    a radio base station whose electric field intensity was the strongest and a mobile station that measured it are selected as the mobile station as the object of the handover and the radio base station serving as the communicating counterpart thereof, excepting a set of the mobile station and the radio base station under current communication, based on electric field intensity information about the radio base stations obtained from each mobile station.

4. The handover control method as claimed in claim 1 or 2, wherein
    a mobile station to which allocation of radio resources is the nearest to the minimum bandwidth and a radio base station which has the most radio resources available are selected as the mobile station and the radio base station for the handover object.

5. The handover control method as claimed in claim 1 or 2, wherein
    a mobile station that requires the radio resources in the highest value of the minimum bandwidth and a radio base station in which the radio resources are available the most are selected as the mobile station and the radio base station for the handover object.

6. The handover control method as claimed in claim 1 or 2, wherein
    the detection of an inability to communicate while the predetermined minimum bandwidth secured at any of mobile stations that communicate with the radio base station is realized by measuring an electric field intensity, a bit error rate, a frame error rate, a packet error rate, a packet discarding rate, or any combination thereof and basing on the measuring result thereof.

7. The handover control method as claimed in claim 1 or 2, wherein
    said mobile station selects a radio base station that serves as the communicating counterpart after said switching.

8. The handover control method as claimed in claim 1 or 2, wherein
    the radio base station which serves as the communicating counterpart after said switching is selected by a node other than said mobile station;
    information indicative of the selected radio base station is reported to said mobile station from said node; and
    the radio base station which serves as the communicating counterpart of said mobile station is switched to the reported radio base station.

9. The handover control method as claimed in claim 1 or 2, comprising
    detecting when a communication securing a predetermined minimum bandwidth becomes impossible at any of mobile stations that are communicating with a radio base station in a first radio communication system that employs a first communication protocol; and
    transferring information relative to radio resources of said mobile station from said first radio communication system to said second radio communication system via a wired section upon converting the protocol,
    when switching the communicating counterpart of the mobile station that communicates with said radio base station to the second radio base station that employs the second communication protocol when said detection was made.

10. A handover control method which switches a radio base station which serves as the communicating counterpart of a mobile station, comprising:

deciding as to whether communication of a radio base station will be in a traffic congestion condition;

selecting a combination of a mobile station that communicates with said radio base station and a required number of radio base stations required to satisfy a predetermined standard when the decision is made that the communication of the radio base station will become congested; and switching the communicating counterpart of the mobile station in the selected combination to the required number of radio base stations in the combination so that the mobile station communicates with the required number of radio base stations simultaneously.

11. The handover control method as claimed in claim 10, wherein the predetermined standard for selecting a combination of said mobile station and a radio base station is defined based upon an available amount of radio resources of a radio base station or an amount of the radio resources required.

12. The handover control methods as claimed in claim 10 or 11, wherein the predetermined standard for selecting the combination of said mobile station and a radio base station is defined based upon receiving electric field intensity of the communication between the mobile station and the radio base station.

13. The handover control method as claimed in claim 10, wherein the predetermined standard for selecting the combination of said mobile station and a radio base station is defined based upon the ratio of the amount of radio resources permitted to the mobile station to the amount of radio resources currently used in fact.

14. The handover control method as claimed in claim 10, wherein the predetermined standard for selecting the combination of said mobile station and a radio base station is defined based upon the number of the radio base stations which should perform simultaneous communications after switching the communicating counterpart.

15. The handover control method as claimed in claim 10, wherein the predetermined standard for selecting the combination of said mobile station and a radio base station is defined based upon whether the radio base station which is performing the current communication is included in the radio base stations with which the mobile station is to communicate after switching the communicating counterpart.

16. The handover control method as claimed in claim 10, wherein a priority about the appropriateness of mutual communication is given to combinations of each mobile station that communicates with said radio base station and said radio base station and one or more of radio base stations adjacent to the radio base station in accordance with said predetermined standard; and a selection is made in favor of the combination of a mobile station and a radio base station with a higher priority.

17. The handover control method as claimed in claim 10, wherein the process for selecting a combination of any of mobile stations that communicate with said radio base station and one or more radio base stations that can communicate with said mobile station is performed by a node that is connected to each radio base station via a wired section.

18. The handover control method as claimed in claim 10, wherein a mobile station that communicates with said radio base station performs the process for selecting a combination of said mobile station and one or more radio base stations with which said mobile station can communicate according to said predetermined standard.

19. The handover control method as claimed in claim 18, wherein said mobile station which communicates with said radio base station determines whether said radio base station is in a traffic congestion condition.

20. The handover control method as claimed in any one of claims 1, 2, and 10, wherein the communication conditions between the mobile station and one or more radio base stations are supervised after switching the communicating counterpart of said mobile station to said one or more radio base stations; and a process is performed such that the communicating counterpart of said mobile station may be switched again when the supervised communication condition turned into a condition poorer than the predetermined standard condition.

21. The handover control method as claimed in claim 20, wherein an error rate in communication between a mobile station and one or more radio base stations is supervised as said communication condition.

22. A handover system that switches radio base stations as a communicating counterpart of a mobile station, comprising:

detection means for detecting that a radio base station fails to provide a predetermined minimum bandwidth for the mobile station due to increasing shortage of radio resources; and switching control means for switching the communicating counterpart of the mobile station from said radio base station to another base station in response to the detection by said detection means that said radio base station fails to provide the predetermined minimum bandwidth.

23. A handover control system that switches radio base stations serving as a communicating counterpart of a mobile station, comprising:

a detection unit configured to detect an inability of the mobile station to communicate with a radio base station with a predetermined minimum bandwidth condition secured;

a selecting unit configured to select one or more radio base stations based on transmission capacity of the radio base stations such that a totality of said one or more radio base stations provide a total data transmission capacity satisfying the predetermined minimum bandwidth; and a switching control unit configured to change the communicating counterpart of the mobile station from said radio base station to said one or more base stations in response to the detection of the inability by said detection unit so that the mobile station communicates with said one or more base stations simultaneously.

24. The handover control system as claimed in claim 22 or 23, wherein said switching control means comprises selection means for selecting a radio base station whose electric field intensity is the strongest and the mobile station that measured it as the mobile station and the radio base station serving as the communicating counterpart for the handover, based on the electric field intensity information relative to radio base stations obtained from each mobile station, excepting the combination of the mobile station and the radio base station in current communication.

25. The handover control system as claimed in claim 22 or 23, wherein
said switching control means comprises selection means for selecting a combination of a mobile station that is assigned an amount of radio resources the closest to the minimum bandwidth and a radio base station where the radio resources are available the most as the mobile station and the radio base station for the handover.

26. The handover control system as claimed in claim 22 or 23, wherein
said switching control means comprises selection means for selecting a combination of a mobile station that requires a large amount of the radio resource with the highest value of the minimum bandwidth and a radio base station where the radio resources are available the most as the mobile station and the radio base station for the handover.

27. The handover control system as claimed in claim 22 or 23, wherein
said detection means comprises measurement means for measuring an electric field intensity, bit error rate, a frame error rate or a packet discarding rate, or any combinations thereof, and the detection of the inability to communicate of any mobile stations that are communicating with the radio base station while the predetermined minimum bandwidth secured, based on measurement results by said measurement means.

28. The handover control of system as claimed in claim 22 or 23, wherein
said mobile station selects the radio base station serving as the communicating counterpart after said switching.

29. The handover control system as claimed in claim 22 or 23, wherein,
the radio base station which serves as the communicating counterpart after said switching is selected by a node other than said mobile station;
the information on the selected radio base station is reported to said mobile station from said node; and
the switching is made to the reported radio base station as the base station to serve as the communicating counterpart of said mobile station.

30. The handover control system as claimed in claim 22 or 23, wherein
said detection means detects that any mobile station among mobile stations under communication with a radio base station of the first radio communication system that employs the first communication protocol becomes unable to communicate in the condition that the predetermined minimum bandwidth is secured,
said handover control system comprising means that transfers information about radio resources of said mobile station from said first radio communication system to said second radio communication system upon protocol conversion when the communicating counterpart of the mobile station that communicates with said radio base station is switched to a radio base station in the second radio communication system that employs the second communication protocol by said switching control means when said detection means makes said detection.

31. A handover control systems that switches radio base stations which serves as a communicating counterpart of a mobile station, comprising:
a traffic congestion checking unit configured to decide whether communication of a radio base station will be in a traffic congestion condition;
a selection unit configured to select a combination of a given mobile station communicating with said radio base station and a required number of radio stations required to satisfy a predetermined standard when said traffic congestion checking unit determines that the radio base station will be in a traffic congestion condition; and
a switching control unit configured to change the communicating counterpart of the given mobile station in the selected combination to the required number of radio base stations in the combination so that the given mobile station communicates with the required number of radio base stations simultaneously.

32. The handover control system as claimed in claim 31, wherein the predetermined standard for selecting a combination of said mobile station and radio base station is defined based on the amount of available radio resources in the radio base station, or the amount of radio resources required.

33. The handover control system as claimed in claim 31 or 32, wherein
the predetermined standard for selecting a combination of said mobile station and a radio base station is defined based upon the receiving electric field intensity in communication between mobile stations and radio base stations.

34. The handover control system as claimed in claim 31, wherein
the predetermined standard for selecting a combination of said mobile station and a radio base station is defined based upon the ratio of the amount of radio resources permitted to the mobile station to the amount of radio resources currently used in fact.

35. The handover control system as claimed in claim 31, wherein
the predetermined standard for selecting a combination of said mobile station and a radio base station is defined based upon the number of the radio base stations which should perform simultaneous communication after switching the communicating counterpart.

36. The handover control system as claimed in claim 31, wherein
the predetermined standard for selecting a combination of said mobile station and a radio base station is defined based upon whether the radio base station which is performing the current communication is included.

37. The handover control system as claimed in claim 31, wherein,
said selection means gives the priority about the appropriateness of mutual communication to combinations of each mobile station that communicates with said radio base station and said radio base station and one or more adjacent radio base stations; and
a combination of a mobile station and a radio base station which is given with the highest priority is selected.

38. The handover control system as claimed in claim 31, wherein said selection means is provided in a node connected to each radio base station via a wired section.

39. The handover control system as claimed in claim 31, wherein a mobile station which communicates with said radio base station selects a combination of said mobile station and one or more radio base stations with which communication is possible in accordance with said predetermined standard.

40. The handover control system as claimed in claim 39, wherein said mobile station that communicates with said radio base station comprises said traffic congestion detection means.

41. The handover control system as claimed in any one of claims 22, 23, and 31, comprising:

communication condition supervision means for supervising the communication condition between the mobile station and one or more radio base stations after switching the communicating counterpart of said mobile station to said one or more radio base stations;

condition decision means for deciding whether the communication condition supervised by said communication condition supervision means will be in a condition poorer than the predetermined standard condition; and re-switching control means for performing process for switching the communicating counterpart of said mobile station again when said condition decision means determines that the communication condition as supervised is in a condition poorer than the predetermined standard condition.

42. The handover control system as claimed in claim 41, wherein said communication condition supervising means comprises error rate detection means for supervising an error rate in communication between a mobile station and one or more radio base stations as said communication condition.

* * * * *